(12) United States Patent
Okumura et al.

(10) Patent No.: US 6,289,411 B1
(45) Date of Patent: Sep. 11, 2001

(54) CIRCUIT FOR GENERATING A CHIP-ENABLE SIGNAL FOR A MULTIPLE CHIP CONFIGURATION

(75) Inventors: Yoshiki Okumura, Kanagawa; Yoshihiro Takamatsuya, Kawasaki; Tomohiro Hayashi, Kanagawa; Shinkichi Gama, Kanagawa; Takeshi Nagase, Kanagawa, all of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/282,195

(22) Filed: Mar. 31, 1999

(30) Foreign Application Priority Data

Jul. 30, 1998 (JP) ................................. 10-215274
Sep. 11, 1998 (JP) ................................. 10-258215

(51) Int. Cl.[7] ...................................... G06F 12/00
(52) U.S. Cl. ................................................ 711/5
(58) Field of Search ................. 365/230.03, 230.01, 365/230.06; 711/100, 103, 5, 115

(56) References Cited

U.S. PATENT DOCUMENTS 6,092,146 * 7/2000 Dell et al. ................................ 711/5

OTHER PUBLICATIONS

Micron DRAM Data book, pp. 7–225 to 7–233 and 9–81 to 9–83, Mar. 1997.*

* cited by examiner

Primary Examiner—Kevin Verbrugge
(74) Attorney, Agent, or Firm—Arent Fox Kintner Plotkin & Kahn, PLLC

(57) ABSTRACT

A circuit for enabling a chip, usable for both a first device capable of having m chips and a second device having more than m chips, includes a first generation unit which generates a chip-enable signal that includes a bit pattern of m bits for enabling one of the m chips indicated by a chip number, a second generation unit which generates a chip-enable generation signal that is to be decoded into a chip-enable signal of at least $2^m$ bits for enabling one of the more than m chips indicated by the chip number, the chip-enable generation signal including a bit pattern identical to the bit pattern of m bits when the chip number is equal to a specific number, and a selection unit which selects and outputs the chip-enable signal generated by the first generation unit when the circuit is used for the first device, and selects and outputs the chip-enable generation signal generated by the second generation unit when the circuit is used for the second device.

16 Claims, 33 Drawing Sheets

FIG.5A

SCHEME 1

| CHIP NUMBER | CEN SIGNAL |
|---|---|
| 0000 | [0001] |
| 0001 | [0010] |
| 0010 | [0100] |
| 0011 | [1000] |

FIG.5B

SCHEME 2

| CHIP NUMBER | CEN GENERATION SIGNAL |
|---|---|
| 0000 | [0001] |
| 0001 | [0010] |
| 0010 | [0011] |
| 0011 | [0100] |
| 0100 | [0101] |
| 0101 | [0110] |
| 0110 | [0111] |
| 0111 | [1000] |
| 1000 | [1001] |
| 1001 | [1010] |
| 1010 | [1011] |
| 1011 | [1100] |
| 1100 | [1101] |
| 1101 | [1110] |
| 1110 | [1111] |
| 1111 | [0000] |

*CEN GENERATION SIGNAL:CHIP NUMBER + 1

FIG.6

| DECODER INPUT (CEN GENERATION SIGNAL) | DECODER OUTPUT (CEN SIGNAL) |
|---|---|
| [0001] | [0000000000000001] |
| [0010] | [0000000000000010] |
| [0011] | [0000000000000100] |
| [0100] | [0000000000001000] |
| [0101] | [0000000000010000] |
| [0110] | [0000000000100000] |
| [0111] | [0000000001000000] |
| [1000] | [0000000010000000] |
| [1001] | [0000000100000000] |
| [1010] | [0000001000000000] |
| [1011] | [0000010000000000] |
| [1100] | [0000100000000000] |
| [1101] | [0001000000000000] |
| [1110] | [0010000000000000] |
| [1111] | [0100000000000000] |
| [0000] | [1000000000000000] |

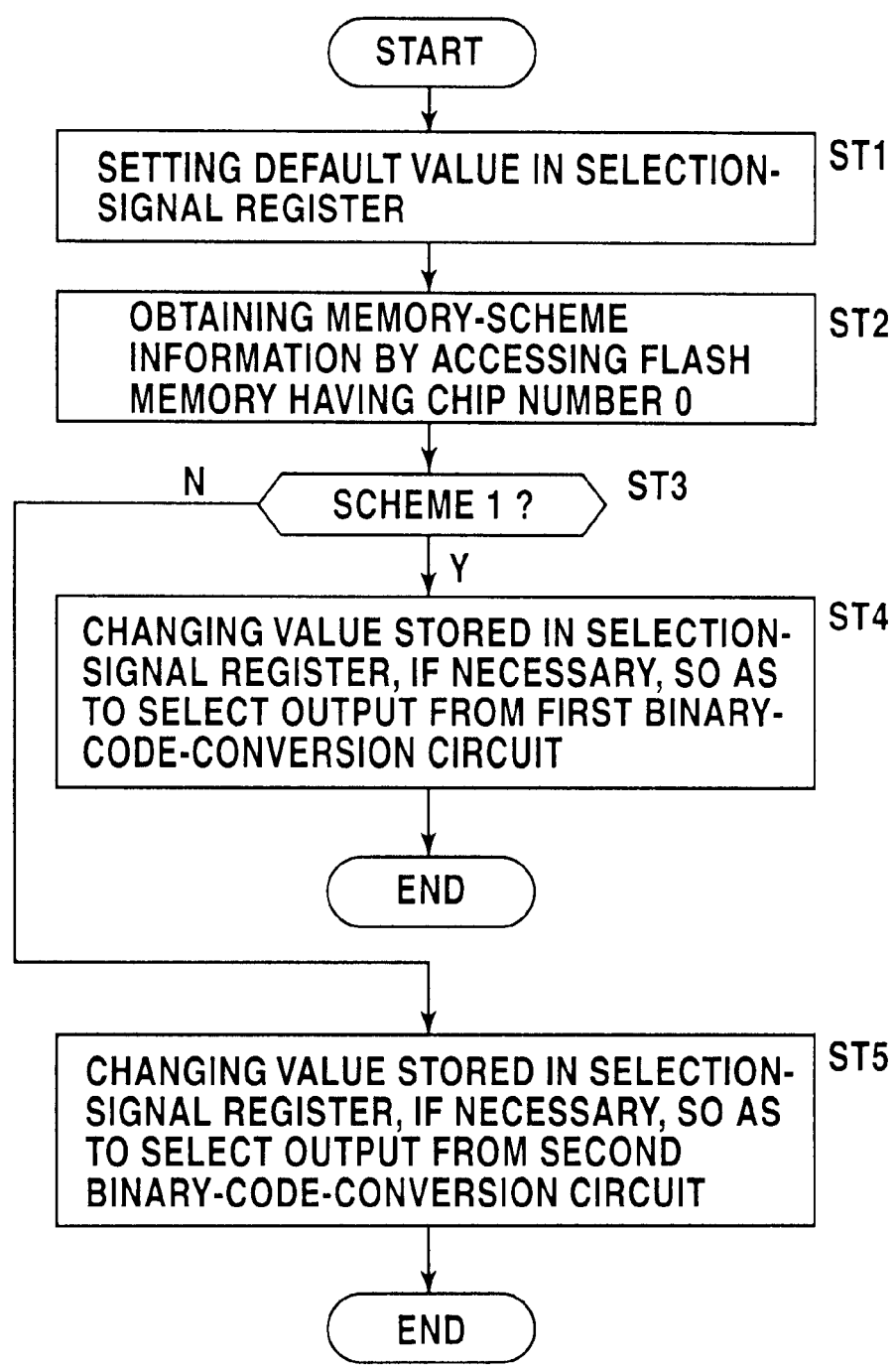

FIG.8A

SCHEME 1

| CHIP NUMBER | CEN SIGNAL |
|---|---|
| 0000 | [1110] |
| 0001 | [1101] |
| 0010 | [1011] |
| 0011 | [0111] |

FIG.8B

SCHEME 2

| CHIP NUMBER | CEN GENERATION SIGNAL |
|---|---|
| 0000 | [1110] |
| 0001 | [1101] |
| 0010 | [1100] |
| 0011 | [1011] |
| 0100 | [1010] |
| 0101 | [1001] |
| 0110 | [1000] |
| 0111 | [0111] |
| 1000 | [0110] |
| 1001 | [0101] |
| 1010 | [0100] |
| 1011 | [0011] |
| 1100 | [0010] |
| 1101 | [0001] |
| 1110 | [0000] |
| 1111 | [1111] |

*CEN GENERATION SIGNAL: (INVERSE OF CHIP NUMBER)-1

FIG.9

| DECODER INPUT (CEN GENERATION SIGNAL) | DECODER OUTPUT (CEN SIGNAL) |
|---|---|
| [1110] | [1111111111111110] |
| [1101] | [1111111111111101] |
| [1100] | [1111111111111011] |
| [1011] | [1111111111110111] |
| [1010] | [1111111111101111] |
| [1001] | [1111111111011111] |
| [1000] | [1111111110111111] |
| [0111] | [1111111101111111] |
| [0110] | [1111111011111111] |
| [0101] | [1111110111111111] |
| [0100] | [1111101111111111] |
| [0011] | [1111011111111111] |
| [0010] | [1110111111111111] |
| [0001] | [1101111111111111] |
| [0000] | [1011111111111111] |
| [1111] | [0111111111111111] |

FIG.10A

SCHEME 1

| CHIP NUMBER | CEN SIGNAL |
|---|---|
| 0001 | [0001] |
| 0010 | [0010] |
| 0011 | [0100] |
| 0100 | [1000] |

FIG.10B

SCHEME 2

| CHIP NUMBER | CEN GENERATION SIGNAL |
|---|---|
| 0001 | [0001] |
| 0010 | [0010] |
| 0011 | [0011] |
| 0100 | [0100] |
| 0101 | [0101] |
| 0110 | [0110] |
| 0111 | [0111] |
| 1000 | [1000] |
| 1001 | [1001] |
| 1010 | [1010] |
| 1011 | [1011] |
| 1100 | [1100] |
| 1101 | [1101] |
| 1110 | [1110] |
| 1111 | [1111] |
| 0000 | [0000] |

*CEN GENERATION SIGNAL: CHIP NUMBER

FIG.11

| DECODER INPUT (CEN GENERATION SIGNAL) | DECODER OUTPUT (CEN SIGNAL) |
|---|---|
| [0001] | [0000000000000001] |
| [0010] | [0000000000000010] |
| [0011] | [0000000000000100] |
| [0100] | [0000000000001000] |
| [0101] | [0000000000010000] |
| [0110] | [0000000000100000] |
| [0111] | [0000000001000000] |
| [1000] | [0000000010000000] |
| [1001] | [0000000100000000] |
| [1010] | [0000001000000000] |
| [1011] | [0000010000000000] |
| [1100] | [0000100000000000] |
| [1101] | [0001000000000000] |
| [1110] | [0010000000000000] |
| [1111] | [0100000000000000] |
| [0000] | [1000000000000000] |

FIG.12A

SCHEME 1

| CHIP NUMBER | CEN SIGNAL |
|---|---|
| 0001 | [1110] |
| 0010 | [1101] |
| 0011 | [1011] |
| 0100 | [0111] |

FIG.12B

SCHEME 2

| CHIP NUMBER | CEN GENERATION SIGNAL |
|---|---|
| 0001 | [1110] |
| 0010 | [1101] |
| 0011 | [1100] |
| 0100 | [1011] |
| 0101 | [1010] |
| 0110 | [1001] |
| 0111 | [1000] |
| 1000 | [0111] |
| 1001 | [0110] |
| 1010 | [0101] |
| 1011 | [0100] |
| 1100 | [0011] |
| 1101 | [0010] |
| 1110 | [0001] |
| 1111 | [0000] |
| *0000 | [1111] |

*CEN GENERATION SIGNAL: INVERSE OF CHIP NUMBER

FIG.13

| DECODER INPUT (CEN GENERATION SIGNAL) | DECODER OUTPUT (CEN SIGNAL) |
|---|---|
| [1110] | [1111111111111110] |
| [1101] | [1111111111111101] |
| [1100] | [1111111111111011] |
| [1011] | [1111111111110111] |
| [1010] | [1111111111101111] |
| [1001] | [1111111111011111] |
| [1000] | [1111111110111111] |
| [0111] | [1111111101111111] |
| [0110] | [1111111011111111] |
| [0101] | [1111110111111111] |
| [0100] | [1111101111111111] |
| [0011] | [1111011111111111] |
| [0010] | [1110111111111111] |
| [0001] | [1101111111111111] |
| [0000] | [1011111111111111] |
| [1111] | [0111111111111111] |

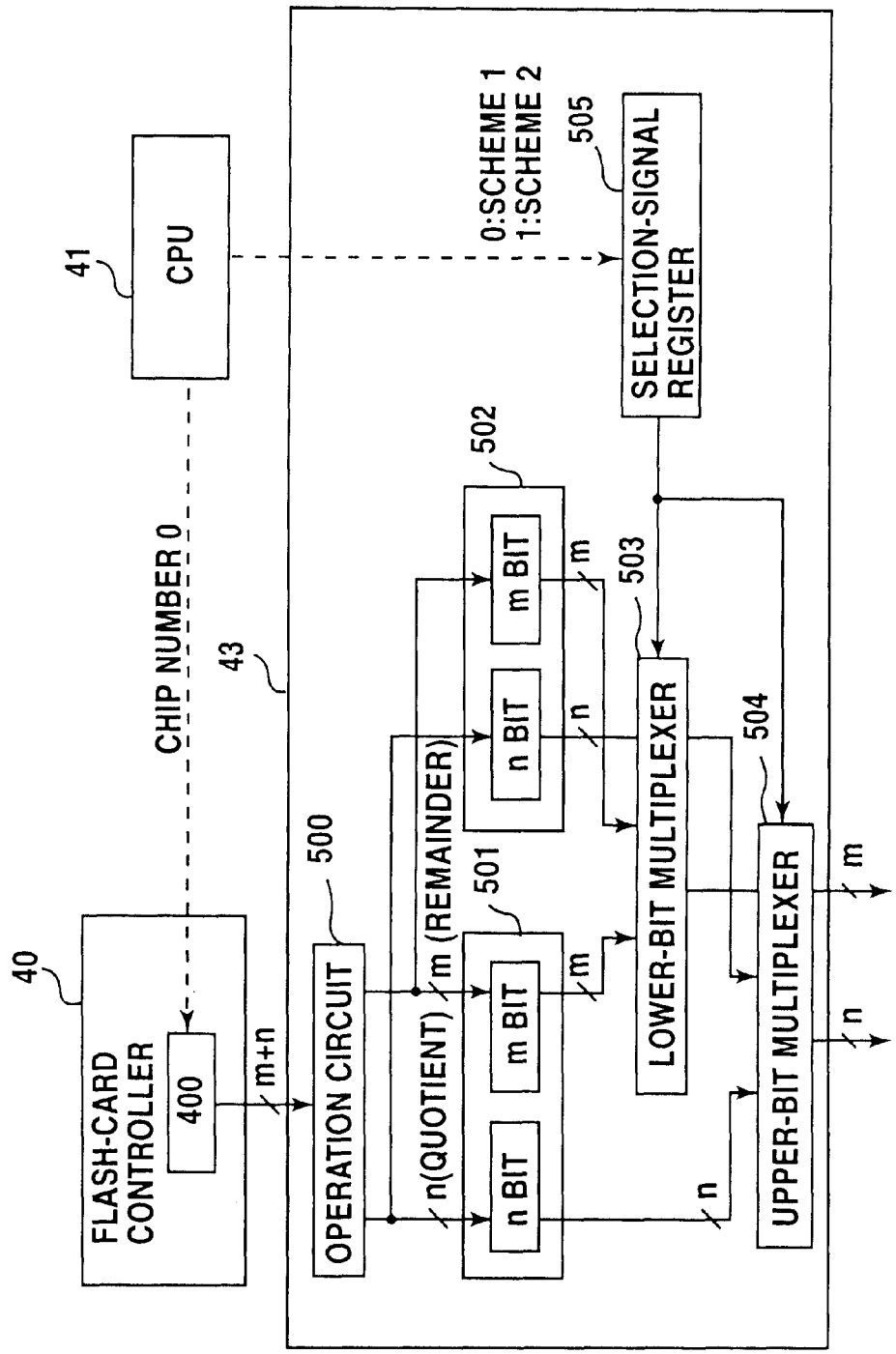

FIG.16

REMAINDER ↓       QUOTIENT →

| | 00 | 01 | 10 | 11 |
|---|---|---|---|---|
| 0000 | 0 | 16 | 32 | 48 |
| 0001 | 1 | 17 | 33 | 49 |
| 0010 | 2 | 18 | 34 | 50 |
| 0011 | 3 | 19 | 35 | 51 |
| 0100 | 4 | 20 | 36 | 52 |
| 0101 | 5 | 21 | 37 | 53 |
| 0110 | 6 | 22 | 38 | 54 |
| 0111 | 7 | 23 | 39 | 55 |
| 1000 | 8 | 24 | 40 | 56 |
| 1001 | 9 | 25 | 41 | 57 |
| 1010 | 10 | 26 | 42 | 58 |
| 1011 | 11 | 27 | 43 | 59 |
| 1100 | 12 | 28 | 44 | 60 |
| 1101 | 13 | 29 | 45 | 61 |
| 1110 | 14 | 30 | 46 | 62 |
| 1111 | 15 | 31 | 47 | 63 |

CHIP NUMBER

FIG.17A

SCHEME 1

| CHIP NUMBER | CEN SIGNAL |
|---|---|
| 0 | [00,0001] |
| 1 | [00,0010] |
| 2 | [00,0100] |
| 3 | [00,1000] |

FIG.17B

SCHEME 2

| CHIP NUMBER | CEN GENERATION SIGNAL |
|---|---|
| 0 | [00,0001] |
| 1 | [00,0010] |
| 2 | [00,0011] |
| 3 | [00,0100] |
| 4 | [00,0101] |
| 5 | [00,0110] |
| . | . |
| 14 | [00,1111] |
| 15 | [00,0000] |
| 16 | [01,0001] |
| . | . |
| 31 | [01,0000] |
| 32 | [10,0001] |
| . | . |
| 47 | [10,0000] |
| 48 | [11,0001] |
| . | . |
| 63 | [11,0000] |

*CEN GENERATION SIGNAL: 2 UPPER BITS/QUOTIENT
4 LOWER BITS/REMAINDER +1

FIG.18

4 LOWER BITS OF DECODER INPUT
↓   00 01 10 11  ← 2 UPPER BITS OF DECODER INPUT

| | 00 | 01 | 10 | 11 |
|---|---|---|---|---|
| 0001 | 0 | 16 | 32 | 48 |
| 0010 | 1 | 17 | 33 | 49 |
| 0011 | 2 | 18 | 34 | 50 |
| 0100 | 3 | 19 | 35 | 51 |
| 0101 | 4 | 20 | 36 | 52 |
| 0110 | 5 | 21 | 37 | 53 |
| 0111 | 6 | 22 | 38 | 54 |
| 1000 | 7 | 23 | 39 | 55 |
| 1001 | 8 | 24 | 40 | 56 |
| 1010 | 9 | 25 | 41 | 57 |
| 1011 | 10 | 26 | 42 | 58 |
| 1100 | 11 | 27 | 43 | 59 |
| 1101 | 12 | 28 | 44 | 60 |
| 1110 | 13 | 29 | 45 | 61 |
| 1111 | 14 | 30 | 46 | 62 |
| 0000 | 15 | 31 | 47 | 63 |

DECODER OUTPUT

ONE BIT BEING 1 WITH
REMAINING BITS BEING 0
AS REPRESENTATION OF
CORRESPONDING BINARY VALUE

FIG.19A

SCHEME 1

| CHIP NUMBER | CEN SIGNAL |
|---|---|
| 0 | [00,1110] |
| 1 | [00,1101] |
| 2 | [00,1011] |
| 3 | [00,0111] |

FIG.19B

SCHEME 2

| CHIP NUMBER | CEN GENERATION SIGNAL |
|---|---|
| 0 | [00,1110] |
| 1 | [00,1101] |
| 2 | [00,1100] |
| 3 | [00,1011] |
| 4 | [00,1010] |
| 5 | [00,1001] |
| . | . |
| 14 | [00,0000] |
| 15 | [00,1111] |
| 16 | [01,1110] |
| . | . |
| 31 | [01,1111] |
| 32 | [10,1110] |
| . | . |
| 47 | [10,1111] |
| 48 | [11,1110] |
| . | . |
| 63 | [11,1111] |

*CEN GENERATION SIGNAL:2 UPPER BITS/QUOTIENT
4 LOWER BITS/(INVERSE OF REMAINDER) -1

FIG.20

4 LOWER BITS OF DECODER INPUT
↓

|  | 00 | 01 | 10 | 11 | ← 2 UPPER BITS OF DECODER INPUT |
|---|---|---|---|---|---|
| 1110 | 0 | 16 | 32 | 48 | |
| 1101 | 1 | 17 | 33 | 49 | |
| 1100 | 2 | 18 | 34 | 50 | |
| 1011 | 3 | 19 | 35 | 51 | |
| 1010 | 4 | 20 | 36 | 52 | |
| 1001 | 5 | 21 | 37 | 53 | |
| 1000 | 6 | 22 | 38 | 54 | |
| 0111 | 7 | 23 | 39 | 55 | DECODER OUTPUT |
| 0110 | 8 | 24 | 40 | 56 | ONE BIT BEING 0 WITH |
| 0101 | 9 | 25 | 41 | 57 | REMAINING BITS BEING 1 |
| 0100 | 10 | 26 | 42 | 58 | AS REPRESENTATION OF CORRESPONDING BINARY VALUE |
| 0011 | 11 | 27 | 43 | 59 | |
| 0010 | 12 | 28 | 44 | 60 | |
| 0001 | 13 | 29 | 45 | 61 | |
| 0000 | 14 | 30 | 46 | 62 | |
| 1111 | 15 | 31 | 47 | 63 | |

FIG.21

|  | 00 | 01 | 10 | 11 | ← QUOTIENT |
|---|---|---|---|---|---|
| 0000 | 1 | 17 | 33 | 49 |  |
| 0001 | 2 | 18 | 34 | 50 |  |
| 0010 | 3 | 19 | 35 | 51 |  |
| 0011 | 4 | 20 | 36 | 52 |  |
| 0100 | 5 | 21 | 37 | 53 |  |
| 0101 | 6 | 22 | 38 | 54 |  |
| 0110 | 7 | 23 | 39 | 55 |  |
| 0111 | 8 | 24 | 40 | 56 | CHIP NUMBER |
| 1000 | 9 | 25 | 41 | 57 |  |
| 1001 | 10 | 26 | 42 | 58 |  |
| 1010 | 11 | 27 | 43 | 59 |  |
| 1011 | 12 | 28 | 44 | 60 |  |
| 1100 | 13 | 29 | 45 | 61 |  |
| 1101 | 14 | 30 | 46 | 62 |  |
| 1110 | 15 | 31 | 47 | 63 |  |
| 1111 | 16 | 32 | 48 | 64 |  |

REMAINDER (row labels, arrow pointing down)

FIG.22A

SCHEME 1

| CHIP NUMBER | CEN SIGNAL |
|---|---|
| 0 | [00,0001] |
| 1 | [00,0010] |
| 2 | [00,0100] |
| 3 | [00,1000] |

FIG.22B

SCHEME 2

| CHIP NUMBER | CEN GENERATION SIGNAL |
|---|---|
| 1 | [00,0001] |
| 2 | [00,0010] |
| 3 | [00,0011] |
| 4 | [00,0100] |
| 5 | [00,0101] |
| 6 | [00,0110] |
| . | . |
| 15 | [00,1111] |
| 16 | [00,0000] |
| 17 | [01,0001] |
| . | . |
| 32 | [01,0000] |
| 33 | [10,0001] |
| . | . |
| 48 | [10,0000] |
| 49 | [11,0001] |
| . | . |
| 63 | [11,1111] |
| 64 | [11,0000] |

*CEN GENERATION SIGNAL:2 UPPER BITS/QUOTIENT
4 LOWER BITS/REMAINDER +1

FIG.23

4 LOWER BITS OF DECODER INPUT

| | 00 | 01 | 10 | 11 | ← 2 UPPER BITS OF DECODER INPUT |
|---|---|---|---|---|---|
| 0001 | 1 | 17 | 33 | 49 | |
| 0010 | 2 | 18 | 34 | 50 | |
| 0011 | 3 | 19 | 35 | 51 | |
| 0100 | 4 | 20 | 36 | 52 | |
| 0101 | 5 | 21 | 37 | 53 | |
| 0110 | 6 | 22 | 38 | 54 | |
| 0111 | 7 | 23 | 39 | 55 | |
| 1000 | 8 | 24 | 40 | 56 | DECODER OUTPUT |
| 1001 | 9 | 25 | 41 | 57 | ONE BIT BEING 1 WITH |
| 1010 | 10 | 26 | 42 | 58 | REMAINING BITS BEING 0 AS REPRESENTATION OF |
| 1011 | 11 | 27 | 43 | 59 | CORRESPONDING BINARY VALUE |
| 1100 | 12 | 28 | 44 | 60 | |
| 1101 | 13 | 29 | 45 | 61 | |
| 1110 | 14 | 30 | 46 | 62 | |
| 1111 | 15 | 31 | 47 | 63 | |
| 0000 | 16 | 32 | 48 | 64 | |

FIG.24A

SCHEME 1

| CHIP NUMBER | CEN SIGNAL |
|---|---|
| 1 | [00,1110] |
| 2 | [00,1101] |
| 3 | [00,1011] |
| 4 | [00,0111] |

FIG.24B

SCHEME 2

| CHIP NUMBER | CEN GENERATION SIGNAL |
|---|---|
| 1 | [00,1110] |
| 2 | [00,1101] |
| 3 | [00,1100] |
| 4 | [00,1011] |
| 5 | [00,1010] |
| 6 | [00,1001] |
| . | . |
| 15 | [00,0000] |
| 16 | [00,1111] |
| 17 | [01,1110] |
| . | . |
| 32 | [01,1111] |
| 33 | [10,1110] |
| . | . |
| 48 | [10,1111] |
| 49 | [11,1110] |
| . | . |
| 63 | [11,0000] |
| 64 | [11,1111] |

*CEN GENERATION SIGNAL: 2 UPPER BITS/QUOTIENT
4 LOWER BITS/(INVERSE OF REMAINDER)-1

FIG.25

4 LOWER BITS OF DECODER INPUT

↓ 00 01 10 11 ← 2 UPPER BITS OF DECODER INPUT

| | 00 | 01 | 10 | 11 |
|---|---|---|---|---|
| 1110 | 1 | 17 | 33 | 49 |
| 1101 | 2 | 18 | 34 | 50 |
| 1100 | 3 | 19 | 35 | 51 |
| 1011 | 4 | 20 | 36 | 52 |
| 1010 | 5 | 21 | 37 | 53 |
| 1001 | 6 | 22 | 38 | 54 |
| 1000 | 7 | 23 | 39 | 55 |
| 0111 | 8 | 24 | 40 | 56 |
| 0110 | 9 | 25 | 41 | 57 |
| 0101 | 10 | 26 | 42 | 58 |
| 0100 | 11 | 27 | 43 | 59 |
| 0011 | 12 | 28 | 44 | 60 |
| 0010 | 13 | 29 | 45 | 61 |
| 0001 | 14 | 30 | 46 | 62 |
| 0000 | 15 | 31 | 47 | 63 |
| 1111 | 16 | 32 | 48 | 64 |

DECODER OUTPUT

ONE BIT BEING 0 WITH REMAINING BITS BEING 1 AS REPRESENTATION OF CORRESPONDING BINARY VALUE

FIG.26

| BYTE POSITION | DATA |
|---|---|
| 0~499 | ANY DATA INCLUDING INDICATION OF SCHEME |
| 500 | NUMBER OF FLASH MEMORIES |
| 501 | TIME THAT PASSES BEFORE ENTERING LOW-POWER-CONSUMPTION MODE |
| 502 | DATA FOR INFORMING OF DELETED STATUS |
| 503 | INVALID/VALID STATUS OF SPECIFIED BITS OF INTERNAL REGISTER |
| 504 | CARD STANDARD |
| 505 | METHOD OF GENERATING INTERNAL TABLE |
| 506~515 | ANY DATA |

FIG.31

| CHIP "0" | CHIP "1" | CHIP "2" | CHIP "3" |
|---|---|---|---|
| BLOCK NUMBER OF BLOCK THAT STORES LOGICAL ADDRESS "0" | BLOCK NUMBER OF BLOCK THAT STORES LOGICAL ADDRESS "1" | BLOCK NUMBER OF BLOCK THAT STORES LOGICAL ADDRESS "2" | BLOCK NUMBER OF BLOCK THAT STORES LOGICAL ADDRESS "3" |
| BLOCK NUMBER OF BLOCK THAT STORES LOGICAL ADDRESS "4" | BLOCK NUMBER OF BLOCK THAT STORES LOGICAL ADDRESS "5" | BLOCK NUMBER OF BLOCK THAT STORES LOGICAL ADDRESS "6" | BLOCK NUMBER OF BLOCK THAT STORES LOGICAL ADDRESS "7" |
| BLOCK NUMBER OF BLOCK THAT STORES LOGICAL ADDRESS "8" | BLOCK NUMBER OF BLOCK THAT STORES LOGICAL ADDRESS "9" | BLOCK NUMBER OF BLOCK THAT STORES LOGICAL ADDRESS "10" | BLOCK NUMBER OF BLOCK THAT STORES LOGICAL ADDRESS "11" |
| BLOCK NUMBER OF BLOCK THAT STORES LOGICAL ADDRESS "8" | BLOCK NUMBER OF BLOCK THAT STORES LOGICAL ADDRESS "9" | BLOCK NUMBER OF BLOCK THAT STORES LOGICAL ADDRESS "10" | BLOCK NUMBER OF BLOCK THAT STORES LOGICAL ADDRESS "11" |
| ..... | ..... | ..... | ..... |

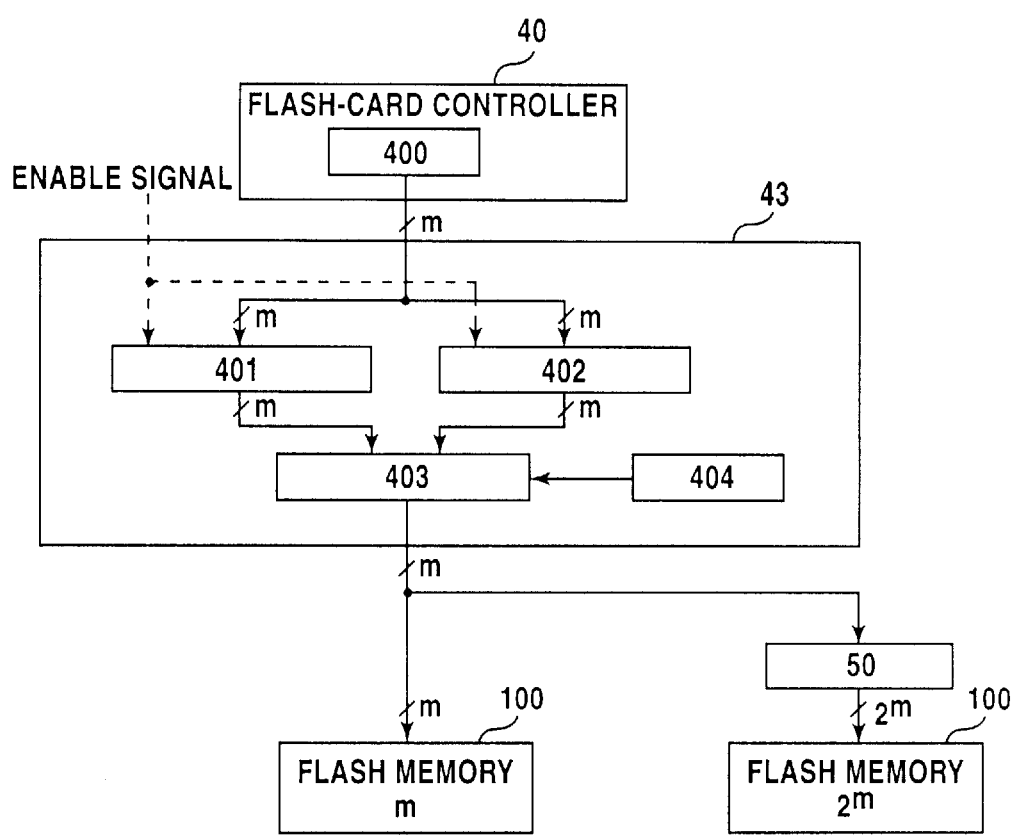

CIRCUIT FOR GENERATING A CHIP-ENABLE SIGNAL FOR A MULTIPLE CHIP CONFIGURATION

BACKGROUND OF THE INVENTION

1. Field of the Invention

The present invention relates to a chip-enable-signal generation circuit usable for both a device having m chips at maximum and a device having $2^m$ chips at maximum or usable for both a device having m chips at maximum and a device having $2^{m+n}$ chips at maximum, and, also, relates to a memory device designed to have such a chip-enable-signal generation circuit implemented thereon. The present invention particularly relates to a chip-enable-signal generation circuit which can generate an appropriate chip-enable signal even if chip information is not supplied externally, and relates to a memory device designed to have such a chip-enable-signal generation circuit implemented thereon.

Flash memories have been making a progress in the market. Flash memories are EEPROMs having a function to erase the memory contents at once. Since flash memories can be made small with high circuit density, their applications to various electronics equipment are anticipated.

Because of the wide range of applications, memory cards having flash memories therein are expected to be provided in a variety of product types, ranging from one having several flash memories to one having several dozens of flash memories in accordance with the types of electronics equipment to which they are applied. It is difficult, however, to provide different types of controllers for different types of memory cards according to the number of flash memories. It is necessary to cope with this situation without increasing the number of terminals, for example.

2. Description of the Related Art

Methods of generating a chip-enable signal supplied to flash memory chips or the like include generating a chip-enable signal by allocating the chip-enable signal directly to each bit of a binary code, or generating a chip-enable signal by decoding a binary code.

When generating a chip-enable signal for m chips, for example, the former method allocates a chip-enable signal to each bit of a m-bit binary code so as to indicate an enable status of a selected one of the m chips.

When a first one of four chips is to be enabled, for example, a chip-enable signal [0001] is generated. When the second chip is to be enabled, a chip-enable signal [0010] is generated. By the same token, a chip-enable signal [0100] is generated in order to enable the third chip. Finally, a chip-enable signal [1000] enables the fourth chip.

When generating a chip-enable signal for $2^m$ chips, the latter method decodes a m-bit binary codes, and generates a chip-enable signal indicative of an enable status of a selected chip.

In order to enable a first one of 16 chips, for example, a binary code [0001] is decoded to generate a chip-enable signal [0000000000000001]. When the second chip is to be enabled, a binary code [0010] is decoded to generate a chip-enable signal [0000000000000010]. Further, a binary code [0011] is decoded to generate a chip-enable signal [0000000000000100], which is to enable the third chip.

The former method generates a chip-enable signal for m chips by using a m-bit code, so that this method is typically used when the number of chips is relatively small. The latter method generates a chip-enable signal for $2^m$ chips by using a m-bit code, so that this method is typically used when the number of chip is relatively large.

When there is a need to supply a chip-enable signal to flash memory chips or the like, a controller for generating the chip-enable signal usually generates the chip-enable signal based on the former method in the case of a small number of chips, and generates the chip-enable signal based on the latter method in the case of a large number of chips.

In order to make a single controller usable for both a device having a small number of chips and a device having a large number of chips, the controller needs to be informed whether it is implemented on the device having a small number of chips or on the device having a large number of chips In this manner, the controller can select an appropriate method of generating a signal.

In order to achieve this, a related-art controller is provided with a dedicated terminal for signal exchange. This dedicated terminal is used for informing the controller of the number of chips or an appropriate method of generating a chip-enable signal.

In such a configuration, the controller already having many terminals for signal exchanges with external sources needs to have an extra terminal dedicated for this purpose.

An increase in the number of terminals hinders an effort to miniaturize a controller size. Use of the configuration described above results in the miniaturization of a controller device being undermined.

Devices having flash memories implemented thereon are typically expected to be provided in a small size by utilizing a relatively small size of the flash memories. The configuration of the related art, therefore, goes against this expectation for miniaturization.

Accordingly, there is a need for a chip-enable-signal generation circuit which is usable for both a device having m chips at maximum and a device having $2^m$ chips at maximum or usable for both a device having m chips at maximum and a device having $2^{m+n}$ chips at maximum, and can generate an appropriate chip-enable signal without requiring external help to obtain information about chips on the device, and, also, there is a need for a memory device suitable for having such a chip-enable-signal generation circuit implemented thereon.

SUMMARY OF THE INVENTION

Accordingly, it is a general object of the present invention to provide a chip-enable-signal generation circuit and a memory device which can satisfy the respective need described above.

It is another and more specific object of the present invention to provide a chip-enable-signal generation circuit which is usable far both a device having m chips at maximum and a device having $2^m$ chips at maximum or usable for both a device having m chips at maximum and a device having $2^{m+n}$ chips at maximum, and can generate an appropriate chip-enable signal without requiring external help to obtain information about chips on the device.

It is yet another object of the present invention to provide a memory device suitable for having such a chip-enable-signal generation circuit as described above implemented thereon.

In order to achieve the above objects according to the present invention, a circuit for enabling a chip, usable for both a first device capable of having m chips and a second device having more than m chips, includes a first generation unit which generates a chip-enable signal that includes a bit pattern of m bits for enabling one of the m chips indicated by a chip number, a second generation unit which generates a chip-enable generation signal that is to be decoded into a chip-enable signal of at least $2^m$ bits for enabling one of the more than m chips indicated by the chip number, the chip-enable generation signal including a bit pattern identical to the bit pattern of m bits when the chip number is equal to a specific number, and a selection unit which selects and outputs the chip-enable signal generated by the first generation unit when the circuit is used for the first device, and selects and outputs the chip-enable generation signal generated by the second generation unit when the circuit is used for the second device.

According to the circuit as described above, the chip-enable signal and the chip-enable generation signal include the same bit pattern when the chip number is the specific number. Because of this feature, a predetermined one of the chips specified by the specific number can be enabled and accessed by using the specific number regardless of whether the first device with m chips is provided or the second device with more than m chips is provided, no matter which one of the chip-enable signal or the chip-enable generation signal is initially selected. The circuit thus can obtain information about whether the first device is in use or the second device is in use by accessing the predetermined one of the chips specified by the specific number if the information is stored in the predetermined one of the chips.

The circuit as described above further includes an acquisition unit which obtains information about whether the circuit is used for the first device or is used for the second device, the information being obtained by accessing one of the chips that is enabled by the chip-enable signal corresponding to the specific number, and a setting unit which sets a selection signal based on the information obtained by the acquisition unit, the selection signal controlling the selection unit with regard to whether the chip-enable signal generated by the first generation unit is selected or the chip-enable generation signal generated by the second generation unit is selected.

By use of the circuit described above, a chip specified by the specific chip number is enabled when the specific chip number is issued, no matter whether the first device is in use or the second device is in use. When the information about whether the first device is in use or the second device is in use is stored in the chip specified by the specific chip number, the acquisition unit can ascertain which one of the first device and the second device is in use by issuing the specific chip number. In this manner, the circuit can subsequently generate an appropriate chip-enable signal without requiring external help to obtain information about a configuration of the chips implemented on the employed device.

Further, a memory device according to the present invention includes a CPU, one or more memories capable of retaining data thereof even when power is not supplied thereto, and a controller which controls the one or more memories in accordance with instructions from the CPU, wherein the one or more memories store information necessary for operation thereof, and the CPU controls the controller to read the information from the one or more memories when the memory device starts an operation thereof and to store the information in a register so that a program executed by the CPU can refer to the information stored in the register.

According to the memory device described above, memories that can retain data thereof during a time when power is not supplied stores information necessary for operation of the memory device, and the information is loaded to a register that is referred to by a program when the memory device starts an operation thereof. Because of this configuration, there is no need to provide an extra connector terminal to the memory device for the purpose of informing the memory device of the information necessary for the operation thereof. Further, the operation information of the memory device can be easily modified by rewriting the operation information stored in the memories.

Further, a memory device according to the present invention includes a CPU, memory chips, and a generation unit which supply either a chip-enable signal that enables one of the memory chips or a chip-enable generation signal that is to be decoded to enable one of the memory chips, wherein the CPU controls the generation unit to supply the chip-enable signal to attempt to access one of the memory chips enabled by the chip-enable signal when the memory device starts an operation thereof, and subsequently controls the generation unit to supply the chip-enable signal when the attempt is successful and to supply the chip-enable generation signal when the attempt is unsuccessful.

Moreover, a memory device according to the present invention includes a CPU, memory chips, and a generation unit which supply either a chip-enable signal that enables one of the memory chips or a chip-enable generation signal that is to be decoded to enable one of the memory chips, wherein the CPU controls the generation unit to supply the chip-enable generation signal to attempt to access one of the memory chips enabled by the chip-enable generation signal when the memory device starts an operation thereof, and subsequently controls the generation unit to supply the chip-enable generation signal when the attempt is successful and to supply the chip-enable signal when the attempt is unsuccessful.

In the memory device described above, both the chip-enable signal supplied to the memories and the chip-enable generation signal that is to be decoded to generate a chip-enable signal supplied to the memories are generated, and the chip-enable signal is selected and supplied to the memories when no decoder is provided, whereas the chip-enable generation signal is selected and supplied to a decoder when such a decoder is provided. In this manner, a decision is easily made as to whether to supply the chip-enable signal or to supply the chip-enable generation signal.

Other objects and further features of the present invention will be apparent from the following detailed description when read in conjunction with the accompanying drawings.

BRIEF DESCRIPTION OF THE DRAWINGS

FIG. 5A is an illustrative drawing showing a code-conversion process of a first binary-code-conversion circuit;

FIG. 5B is an illustrative drawing showing a code-conversion process of a second binary-code-conversion circuit;

FIG. 6 is an illustrative drawing for explaining a decoding operation of a decoder;

FIG. 7 is a flowchart of a process performed by a CPU;

FIG. 8A is an illustrative drawing showing a code-conversion process of the first binary-code-conversion circuit in the case of negative logic;

FIG. 8B is an illustrative drawing showing a code-conversion process of the second binary-code-conversion circuit in the case of negative logic;

FIG. 9 is an illustrative drawing for explaining a decoding operation of the decoder in the case of negative logic;

FIG. 10A is an illustrative drawing showing a code-conversion process of the first binary-code-conversion circuit;

FIG. 10B is an illustrative drawing showing a code-conversion process of the second binary-code-conversion circuit;

FIG. 11 is an illustrative drawing for explaining a decoding operation of the decoder;

FIG. 12A is an illustrative drawing showing a code-conversion process of the first binary-code-conversion circuit in the case of negative logic;

FIG. 12B is an illustrative drawing showing a code-conversion process of the second binary-code-conversion circuit in the case of negative logic;

FIG. 13 is an illustrative drawing for explaining a decoding operation of the decoder in the case of negative logic;

FIG. 14 is a block diagram of the chip-enable-signal generation circuit according to another embodiment of the present invention;

FIG. 16 is an illustrative drawing for explaining a remainder and a quotient obtained from a chip number;

FIG. 17A is an illustrative drawing showing a code-conversion process of a first binary-code-conversion circuit;

FIG. 17B is an illustrative drawing showing a code-conversion process of a second binary-code-conversion circuit;

FIG. 18 is an illustrative drawing for explaining a decoding operation of the decoder;

FIG. 19A is an illustrative drawing showing a code-conversion process of the first binary-code-conversion circuit in the case of negative logic;

FIG. 19B is an illustrative drawing showing a code-conversion process of the second binary-code-conversion circuit in the case of negative logic;

FIG. 20 is an illustrative drawing for explaining a decoding operation of the decoder in the case of negative logic;

FIG. 21 is an illustrative drawing showing a set of a remainder and a quotient obtained from a set of chip numbers;

FIG. 22A is an illustrative drawing showing a code-conversion process of the first binary-code-conversion circuit;

FIG. 22B is an illustrative drawing showing a code-conversion process of the second binary-code-conversion circuit;

FIG. 23 is an illustrative drawing for explaining a decoding operation of the decoder;

FIG. 24A is an illustrative drawing showing a code-conversion process of the first binary-code-conversion circuit in the case of negative logic;

FIG. 24B is an illustrative drawing showing a code-conversion process of the second binary-code-conversion circuit in the case of negative logic;

FIG. 25 is an illustrative drawing for explaining a decoding operation of the decoder in the case of negative logic;

FIG. 26 is an illustrative drawing showing an example of various pieces of information stored in a first one of the flash memories;

FIG. 31 is an illustrative drawing showing a configuration of an internal table;

FIG. 32 is a block diagram of the chip-enable-signal generation circuit with details added to a configuration of FIG. 4;

DESCRIPTION OF THE PREFERRED EMBODIMENTS

In the following, a principle and embodiments of the present invention will be described with reference to the accompanying drawings.

Figure 1:
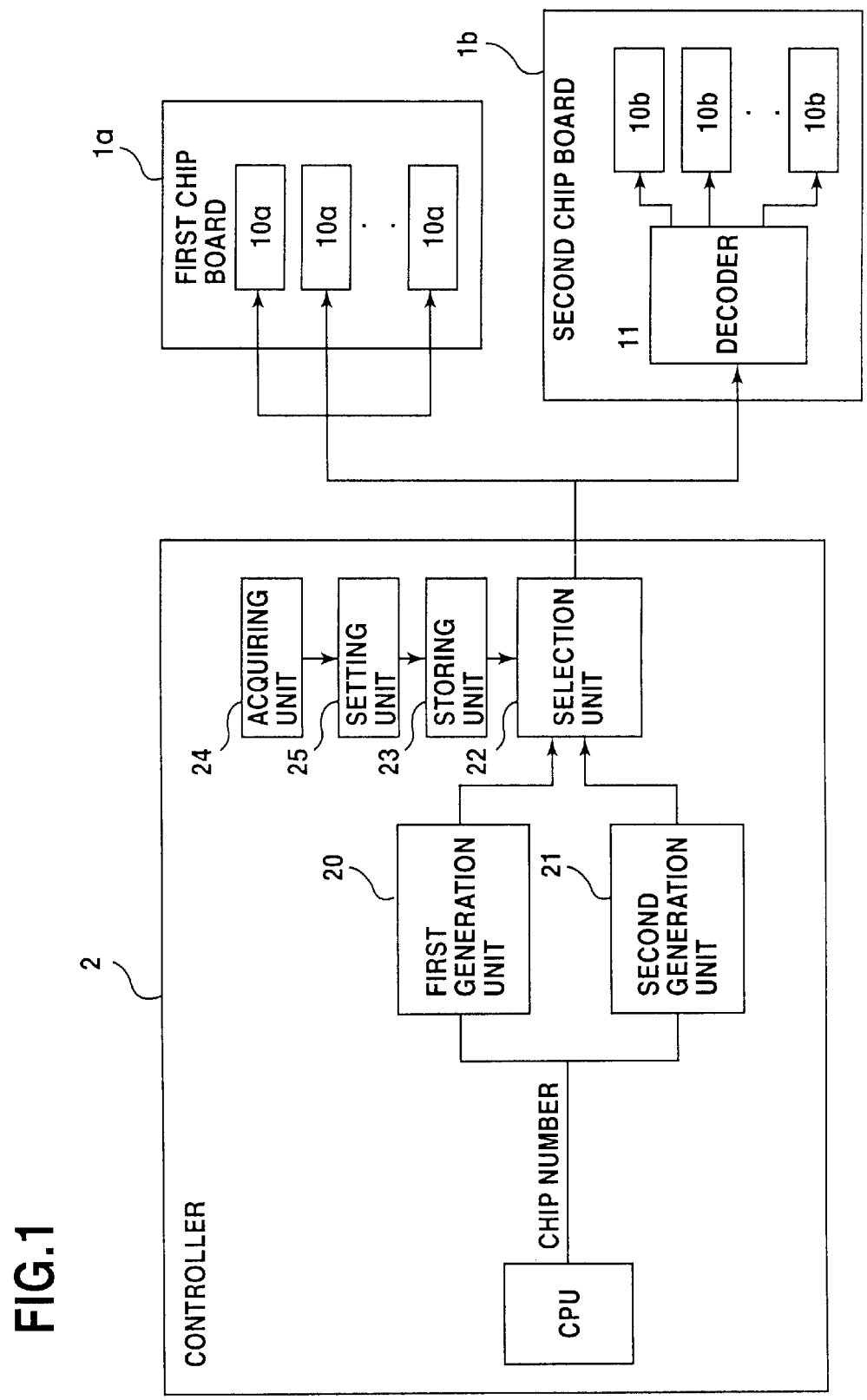
FIG. 1 is a block diagram of a configuration according to a principle of the present invention.

FIG. 1 is a block diagram of a configuration according to a principle of the present invention.

The configuration of FIG. 1 includes a first chip board 1a, a second chip board 1b, and a controller 2 embodying the present invention therein.

The first chip board 1a carries thereon memory chips 10a, a total number of which is m at maximum. The second chip board 1b carries thereon memory chips 10b, a total number of which is $2^m$ at maximum or $2^{m+n}$ at maximum.

The second chip board 1b is further provided with a decoder 11. The decoder 11 generates a chip-enable signal corresponding to $2^m$ bits by decoding a m-bit chip-enable generation signal when the second chip board 1b carries $2^m$ memory chips 10b at maximum. Where the second chip board 1b carries $2^{m+n}$ memory chips 10b at maximum, the decoder 11 generates a chip-enable signal corresponding to $2^{m+n}$ bits by decoding a (m+n)-bit chip-enable generation signal.

The controller 2 is shared by the first chip board 1a and the second chip board 1b. The controller 2 supplies a chip-enable signal to the first chip board 1a when the first chip board 1a is in use. The controller 2 supplies a chip-enable signal to the second chip board 1b when the second chip board 1b is in use.

To this end, the controller 2 includes a first generation unit 20, a second generation unit 21, a selection unit 22, a storing unit 23, an acquiring unit 24, and a setting unit 25.

In the case where the second chip board 1b carries the $2^m$ memory chips 10b at maximum, the first generation unit 20 generates a m-bit chip-enable signal indicating an enable status of one of the memory chips 10a specified by a chip number when a CPU of the controller 2 supplies the chip number.

In the case where the second chip board 1b carries the $2^{m+n}$ memory chips 10b at maximum, the first generation unit 20 obtains a m-bit signal indicating an enable status of one of the memory chips 10a specified by a chip number when the CPU of the controller 2 supplies the chip number, and generates a (m+n)-bit chip-enable signal having the obtained m-bit signal as m lower bits thereof.

In the case where the second chip board 1b carries the $2^m$ memory chips 10b at maximum, the second generation unit 21 generates a m-bit chip-enable generation signal based on the chip number supplied from the CPU of the controller 2 such that a bit pattern of the chip-enable generation signal is identical to that of the chip-enable signal generated by the first generation unit 20.

In the case where the second chip board 1b carries the $2^{m+n}$ memory chips 10b at maximum, the second generation unit 21 obtains a signal having the same bit pattern as the m lower bits of the chip-enable signal generated by the first generation unit 20 based on a remainder left by dividing the chip number by $2^m$ or dividing the chip number minus one by $2^m$ when the CPU of the controller 2 supplies the chip number. Further, the second generation unit 21 obtains a signal having the same bit pattern as the n upper bits of the chip-enable signal generated by the first generation unit 20 based on a quotient obtained by the above-mentioned dividing operation. Then, the second generation unit 21 generates a (m+n)-bit chip-enable generation signal by using the former signal as the m lower bit thereof and the latter signal as the n upper bits thereof.

The selection unit 22 selects the chip-enable signal generated by the first generation unit 20 when the first chip board 1a is in use, and selects the chip-enable generation signal generated by the second generation unit 21 when the second chip board 1b is in use. The selected signal is output from the controller 2.

The storing unit 23 holds a selection signal supplied to the selection unit 22.

The acquiring unit 24 issues a specific chip number, and obtains information about whether the first chip board 1a or the second chip board 1b is in use by acquiring this information from one of the memory chips 10a or 10b indicated by the specific chip number. The setting unit 25 stores the selection signal in the storing unit 23 when the selection signal is defined based on the information obtained by the acquiring unit 24.

In the case where the controller 2 is usable for both the first chip board 1a having the m memory chips 10a at maximum and the second chip board 1b having the $2^m$ memory chips 1b at maximum, the acquiring unit 24 of the present invention specifies the specific chip number as described above so as to access the specified one of the memory chips 10a or 10b.

In response to the specific chip number, the first generation unit 20 generates a m-bit chip-enable signal indicating one of the memory chips 10a specified by the specific chip number. When m is 4 and the specific chip number is 0, for example, a chip-enable signal [0001] is generated to indicate an enable status of the memory chip 10a having the chip number "0".

In response to the specific chip number, the second generation unit 21 generates a m-bit chip-enable generation signal having the same bit pattern as that of the chip-enable signal generated by the first generation unit 20 responding to the specific chip number. When the first generation unit 20 responding to the specific chip number generates a chip-enable signal [0001], for example, the second generation unit 21 generates a chip-enable generation signal [0001].

In this manner, when the acquiring unit 24 issues a specific chip number, the m-bit chip-enable signal generated by the first generation unit 20 and the m-bit chip-enable generation signal generated by the second generation unit 21 have the same bit pattern.

In such a case, the storing unit 23 stores a selection signal that is provided as a default. The selection unit 22 selects the chip-enable signal of the first generation unit 20 or the chip-enable generation signal of the second generation unit 21 according to the default selection signal. Since the bit pattern is the same between the first generation unit 20 and the second generation unit 21, the selection unit 22 selects and outputs the same bit pattern regardless of which one is selected.

Where the first chip board 1a is in use, one of the memory chips 10a specified by the specific chip number is enabled by the signal output from the selection unit 22. When the selection unit 22 outputs a signal [0001], for example, the memory chip 10a having the chip number "0" is enabled.

Where the second chip board 1b is in use, the decoder 11 of the second chip board 1b decodes the signal output from the selection unit 22 to generate a chip-enable signal that enables one of the memory chips 10b specified by the specific chip number. When the selection unit 22 outputs a signal [0001], for example, the memory chip 10b having the chip number "0" is enabled.

In this manner, when the specific chip number is issued, the memory chip 10a or 10b indicated by the specific chip number is enabled regardless of whether the first chip board 1a is in use or the second chip board 1b is in use.

Information about whether the first chip board 1a is in use or the second chip board 1b is in use may be stored in the memory chips 10a or 10b indicated by the specific chip number. In such a case, the acquiring unit 24 can obtain the information by issuing the specific chip number, thereby learning whether the first chip board 1a is in use or the second chip board 1b is in use.

Once the acquiring unit 24 acquires the information, the setting unit 25 stores a selection signal in the storing unit 23 such that the selection signal reflects the acquired information. In response, the storing unit 23 controls the selection unit 22 to select the chip-enable signal generated by the first generation unit 20 when the first chip board 1a is in use, and controls the selection unit 22 to select a chip-enable generation signal generated by the second generation unit 21 when the second chip board 1b is in use.

In the case where the controller 2 is usable for both the first chip board 1a having the m memory chips 10a at maximum and the second chip board 1b having the $2^{m+n}$ memory chips 10b at maximum, the acquiring unit 24 of the present invention specifies a specific chip number so as to access the specified one of the memory chips 10a or 10b.

In response to the specific chip number, the first generation unit 20 obtains a m-bit signal indicating one of the memory chips 10a specified by the specific chip number, and generates a (m+n)-bit chip-enable signal having the m bits of the generated m-bit signal as m lower bits thereof. When m is 4 and n is 2, and when the specific chip number is 0, for example, a chip-enable signal [0001] indicating an enable status of the memory chip 10a having the chip number "0" is used as 4 lower bits, and a signal such as [00] is used as 2 upper bits, thereby generating a chip-enable signal [00, 0001].

In response to the specific chip number, the second generation unit 21 obtains a signal having the same bit pattern as the m lower bits of the chip-enable signal generated by the first generation unit 20 based on a remainder left by dividing the specific chip number by $2^m$ or dividing the specific chip number minus one by $2^m$. Further, the second generation unit 21 obtains a signal having the same bit pattern as the n upper bits of the chip-enable signal generated by the first generation unit 20 based on a quotient obtained by the above-mentioned dividing operation. Then, the second generation unit 21 generates a (m+n)-bit chip-enable generation signal by using the former signal as the m lower bit thereof and the latter signal as the n upper bits thereof. When the first generation unit 20 responding to the specific chip number generates a chip-enable signal [00, 0001], for example, the second generation unit 21 generates a chip-enable generation signal [00,0001].

In this manner, when the acquiring unit 24 issues a specific chip number, the (m+n)-bit chip-enable signal generated by the first generation unit 20 and the (m+n)-bit chip-enable generation signal generated by the second generation unit 21 have the same bit pattern.

In such a case, the storing unit 23 stores a selection signal that is provided as a default. The selection unit 22 selects the chip-enable signal of the first generation unit 20 or the chip-enable generation signal of the second generation unit 21 according to the default selection signal. Since the bit pattern is the same between the first generation unit 20 and the second generation unit 21, the selection unit 22 selects and outputs the same bit pattern regardless of which one is selected.

Where the first chip board 1a is in use, one of the memory chips 10a specified by the specific chip number identified by the m lower bits of the signal that is output from the selection unit 22 is enabled since the first chip board 1a does not receive the n upper bits. When the selection unit 22 outputs a signal [00,0001], for example, the memory chip 10a having the chip number "0" is enabled.

Where the second chip board 1b is in use, the decoder 11 of the second chip board 1b decodes the signal output from the selection unit 22 to generate a chip-enable signal that enables one of the memory chips 10b specified by the specific chip number. When the selection unit 22 outputs a signal [00,0001], for example, the memory chip 10b having the chip number "0" is enabled.

In this manner, when the specific chip number is issued, the memory chip 10a or 10b indicated by the specific chip number is enabled regardless of whether the first chip board 1a is in use or the second chip board 1b is in use.

Information about whether the first chip is board 1a is in use or the second chip board 1b is in use may be stored in the memory chips 10a or 10b indicated by the specific chip number. In such a case, the acquiring unit 24 can obtain the information by issuing the specific chip number, thereby learning whether the first chip board 1a is in use or the second chip board 1b is in use.

Once the acquiring unit 24 acquires the information, the setting unit 25 stores a selection signal in the storing unit 23 such that the selection signal reflects the acquired information. In response, the storing unit 23 controls the selection unit 22 to select the chip-enable signal generated by the first generation unit 20 when the first chip board 1a is in use, and controls the selection unit 22 to-select a chip-enable generation signal generated by the second generation unit 21 when the second chip board 1b is in use.

As described above, when the control device is usable for both a device having m chips at maximum and a device having $2^m$ chips at maximum or usable for both a device having m chips at maximum and a device having $2^{m+n}$ chips at maximum, the controller can generate an appropriate chip-enable signal without requiring external help to obtain information about chips on the devices.

By use of the controller 2 of the present invention, the memory chip 10a or 10b specified by the specific chip number is enabled when the specific chip number is issued, no matter whether the first chip board 1a is in use or the second chip board 1b is in use. When the information about whether the first chip board 1a is in use or the second chip board 1b is in use is stored in the memory chip 10a or 10b specified by the specific chip number, the acquiring unit 24 can ascertain which one of the first chip board 1a and the second chip board 1b is in use by issuing the specific chip number.

Utilizing these features, a memory device according to the present invention includes a CPU, one or more memories capable of keeping data even during a power-off period, and a controller for controlling the one or more memories by issuing commands to the one or more memories according to instructions from the CPU, wherein a memory specified by a specific chip number, which is preferably a first memory, stores information necessary for operations of the memory device, and the information stored in the first memory is read at the time of power on to be stored in a register to which a program running on the CPU refers.

The information necessary for the operation of the memory device is stored in the first memory by the following configuration. This configuration includes an acquiring unit obtaining the information when setting of the information is requested by an external source, and further includes a writing unit which writes the information in the first memory.

When the acquiring unit acquires the information, the writing unit stores the information in the memory that is preferably the first memory. The information includes information about memory connections, control information about a code which is returned when data requested for access is already deleted and not available, identification information regarding specifications of the memory device, control information indicative of whether specified bits of a register is treated as valid bits or invalid bits, identification information regarding a method of generating an internal table, control information about a time which passes before a low-power-consumption mode is engaged, etc.

According to this configuration of the present invention, the information necessary for the operation of the memory device is acquired without use of a connecter terminal or the like. Further, the configuration of the present invention makes it possible to change which processing is performed so as to match the host that issues an access request.

Even when given information indicates use of the first chip board 1a, it is impossible to notify the host issuing an access request to let the host know an appropriate size of memory space if the number of chips are not known. Programs running on the CPU according to the present invention can acquire the information about the number of memory connections without use of a connecter terminal, and, thus, can notify the host of the size of memory space.

Further, if a change is made to the specifications of the memory device, the programs running on the CPU can be adapted without use of a connecter terminal so as to perform processing that matches the host issuing an access request.

In the following, embodiments of the present invention will be described.

Figure 2A:
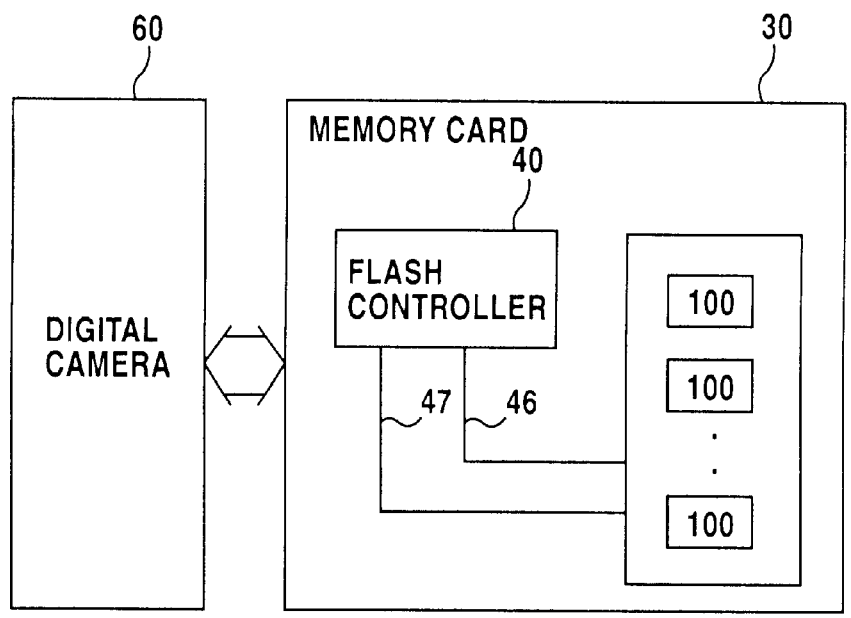
FIGS. 2A and 2B are block diagrams of a memory card according to the present invention.
Figure 2B:
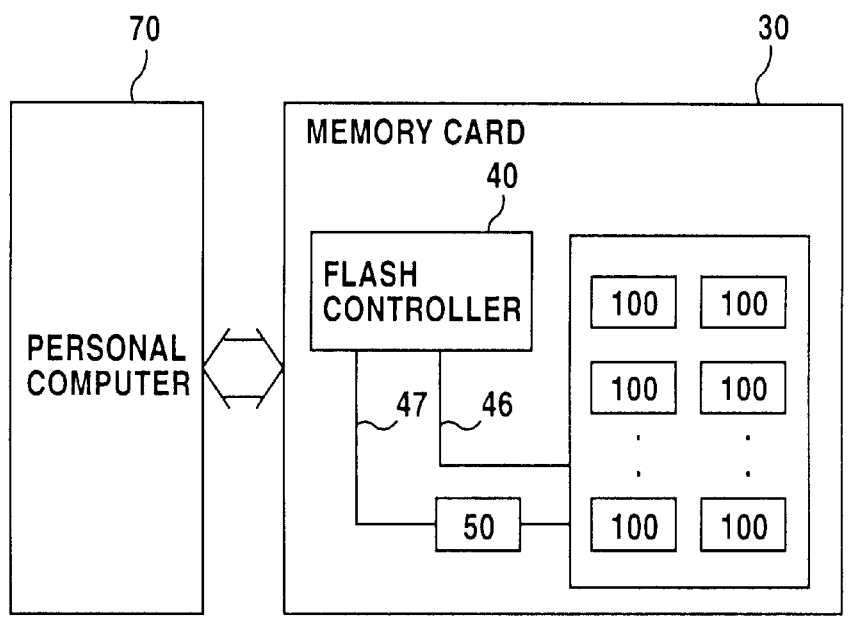

FIGS. 2A and 2B are block diagrams of a memory card according to the present invention.

A memory card 30 is provided with a connecter. Through this connection, the memory card 30 is connected to a slot of a host device in a detachable fashion. Power on which the memory card 30 operates is supplied from the host via the connector.

FIG. 2A shows that the memory card 30 including flash memories 100 is provided in a digital camera 60. FIG. 2B shows that the memory card 30 having the flash memories 100 is provided in a personal computer 70.

When the memory card 30 is provided as part of the digital camera 60, the number of the flash memories 100 is on the order of a single digit because of a demand for miniaturization. On the other hand, when the memory card 30 is provided as part of the personal computer 70, the number of the flash memories 100 may be on the order of several dozens in order to satisfy a demand for a large memory volume.

A flash-card controller 40 is implemented on the memory card 30, and attends to access control of the flash memories 100. When the digital camera 60 or the personal computer 70 requests access to the flash memories 100 at a specified address, the flash-card controller 40 provides access to the specified address of the flash memories 100.

The flash-card controller 40 is so designed as to be usable for both the memory card 30 having a small number of the flash memories 100 and the memory card 30 having a large number of the flash memories 100. To this end, the memory card 30 having a large number of the flash memories 100 includes a decoder 50 as shown in FIG. 2B.

Figure 3:
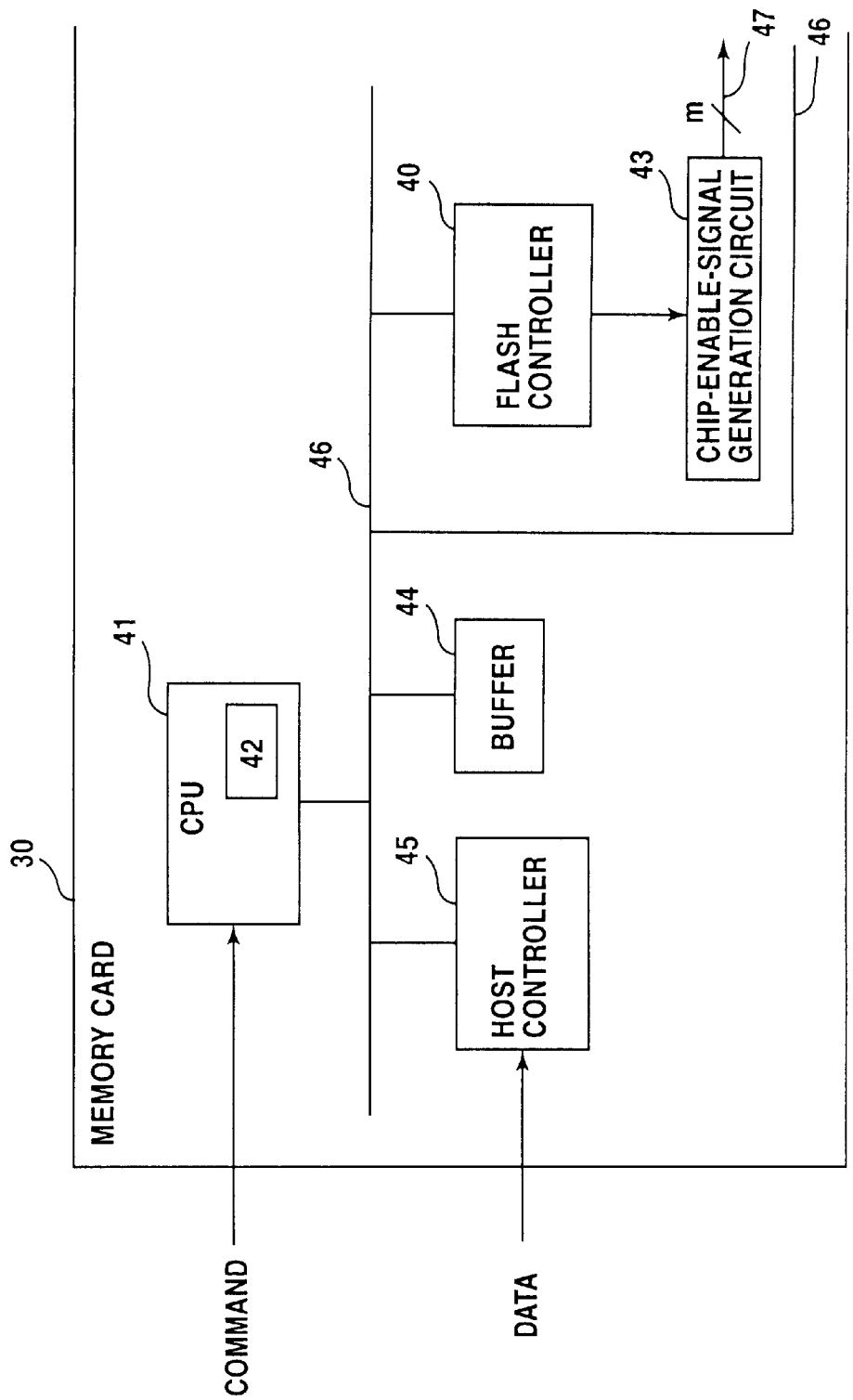
FIG. 3 is a block diagram showing a configuration of the memory card according to the present invention.

FIG. 3 is a block diagram showing a configuration of the memory card 30 according to the present invention.

The memory card 30 of FIG. 3 includes the flash memories 100 and the flash-card controller 40 as described above, and further includes a CPU 41, a ROM 42, a chip-enable-signal generation circuit 43, a buffer 44, a host controller 45, a CPU bus 46, and chip-enable-signal lines 47.

The ROM 42 stores a program for accessing the flash memories 100. Based on this program, the CPU 41 provides an access instruction to the flash-card controller 40 when the digital camera 60 or the personal computer 70 issues an access request, thereby performing access operation with respect to the flash memories 100.

In detail, a first one of the flash memories 100 has configuration information stored therein which specifies the number of the flash memories 100, for example. When the memory card 30 starts an operation thereof, the CPU 41 operating on the program stored in the ROM 42 reads the configuration information and a memory volume of one chip of the flash memories 100 so as to obtain a total memory volume, and notify the digital camera 60 or the personal computer 70 of the obtained total memory volume.

When the digital camera 60 or the personal computer 70 issues an access request by indicating an access address during a normal operation, the CPU 41 operating on the program of the ROM 42 identifies a chip number of one of the flash memories 100 that is to be accessed by taking into account the memory volume of one chip. The CPU 41 then enables one of the flash memories 100 indicated by the chip number, and supplies an access instruction to the flash-card controller 40. In this manner, the CPU 41 performs an access operation with respect to the flash memories 100.

The flash-card controller 40 acquires the right to use the CPU bus 46 in response to the access instruction sent from the CPU 41 to access the flash memories 100. The flash-card controller 40 then issues a flash command to the flash memories 100 to perform an access operation.

The chip-enable-signal generation circuit 43 generates a chip-enable signal in response to a chip number issued by the CPU 41, and sends the chip-enable signal to the flash memories 100 via the chip-enable-signal lines 47, thereby enabling a selected one of the flash memories 100. The buffer 44 stores data to be written in the flash memories 100 and data which has been read from the flash memories 100.

The host controller 45 provides interface between the memory card 30 and the digital camera 60 or the personal computer 70. The CPU bus 46 connects between the flash-card controller 40, the CPU 41, the buffer 44, and the host controller 45.

Figure 4:
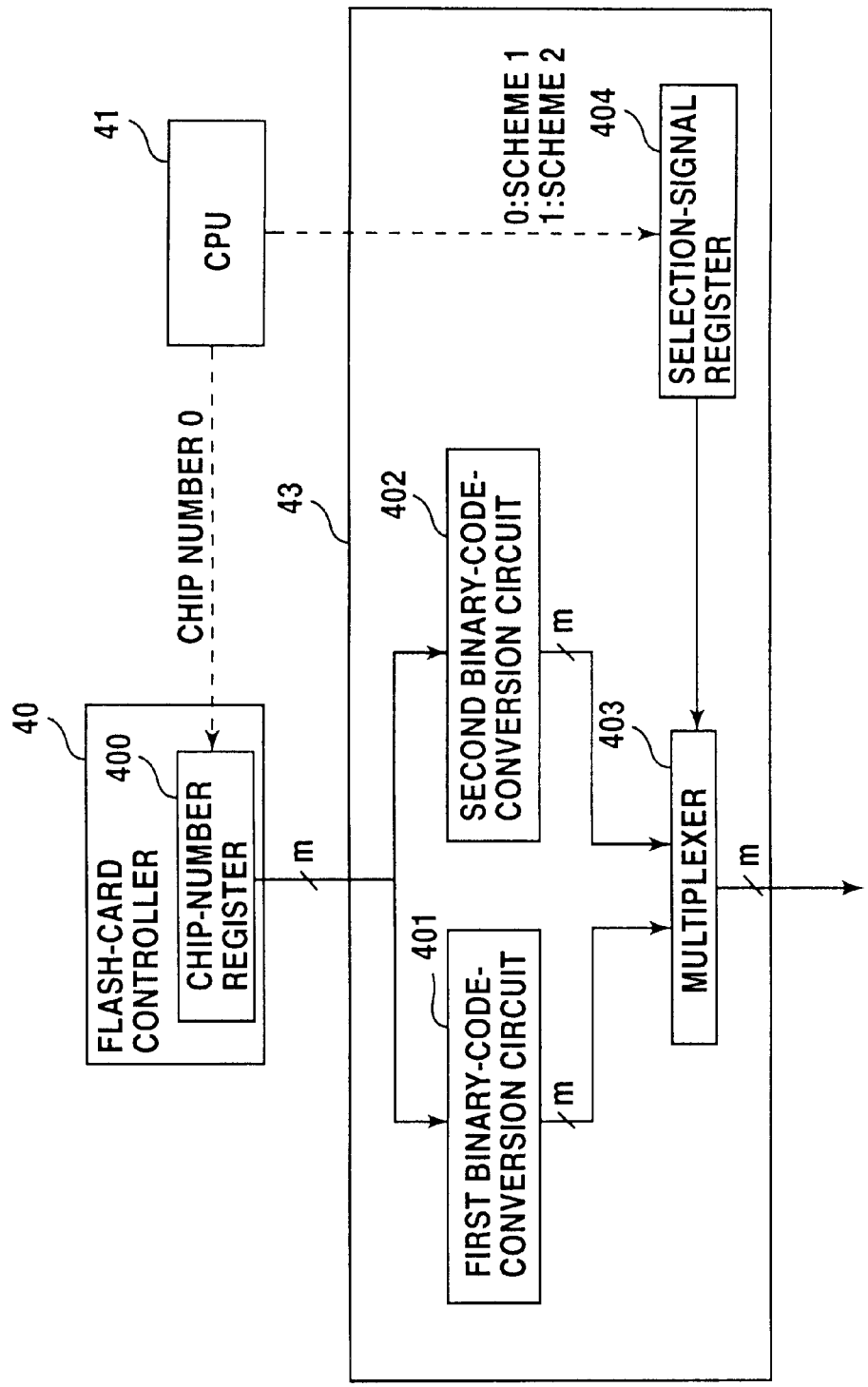
FIG. 4 is a block diagram of a chip-enable-signal generation circuit according to an embodiment of the present invention.

FIG. 4 is a block diagram of a chip-enable-signal generation circuit 43 according to an embodiment of the present invention.

In this embodiment, the chip-enable-signal generation circuit 43 is equipped with a function to generate a chip-enable signal with respect to the m flash memories 100 implemented on the memory card 30 which is provided as part of the digital camera 60, and is equipped with a function to generate a chip-enable signal with respect to the $2^m$ flash memories 100 implemented on the memory card 30 which is provided as part of the personal computer 70.

The chip-enable-signal generation circuit 43 includes a first binary-code-conversion circuit 401, a second binary-code-conversion circuit 402, a multiplexer 403, and a selection-signal register 404. The first binary-code-conversion circuit 401 applies code-conversion processing to a m-bit chip number stored in a chip-number register 400 which is provided in the flash-card controller 40, thereby generating a m-bit chip-enable signal with respect to the m flash memories 100. The second binary-code-conversion circuit 402 applies code-conversion processing to the m-bit chip number stored in the chip-number register 400 which is provided in the flash-card controller 40, thereby generating a m-bit chip-enable generation signal with respect to the $2^m$ flash memories 100. The multiplexer 403 selects either the chip-enable signal from the first binary-code-conversion circuit 401 or the chip-enable generation signal from the second binary-code-conversion circuit 402, and outputs the selected signal to the flash memories 100. The selection-signal register 404 stores a selection signal that is supplied to the multiplexer 403.

The chip-number register 400 in the flash-card controller 40 stores a chip number issued by the CPU 41.

FIG. 5A is an illustrative drawing showing a code-conversion process of the first binary-code-conversion circuit 401. FIG. 5B is an illustrative drawing showing a code-conversion process of the second binary-code-conversion circuit 402.

The code-conversion processes shown in FIGS. 5A and 5B are provided as an example of a case where m is 4. It should be noted that a chip number starts from 0, and the chip-enable signal supplied to the flash memories 100 is represented by positive logic.

As shown in FIG. 5A, the first binary-code-conversion circuit 401 operations as follows when a 4-bit chip number starting from zero is provided When the chip number "0000" is supplied, the first binary-code-conversion circuit 401 generates a chip-enable signal [0001] enabling one of the flash memories 100 having the chip number 0. Further, the first binary-code-conversion circuit 401 generates a chip-enable signal [0010] enabling one of the flash memories 100 having the chip number 1 when the chip number "0001" is provided, and generates a chip-enable signal [0100] enabling one of the flash memories 100 having the chip number 2 when the chip number "0010" is provided. When the chip number "0011" is supplied, the first binary-code-conversion circuit 401 generates a chip-enable signal [1000] enabling one of the flash memories 100 having the chip number 3.

As will be described later in detail, when the CPU 41 issues a chip number no smaller than m, the multiplexer 403 selects a chip-enable generation signal generated by the second binary-code-conversion circuit 402. In such a case, therefore, it does not matter what conversion the first binary-code-conversion circuit 401 carries out in response to such large chip numbers.

The second binary-code-conversion circuit 402 generates a chip-enable generation signal as shown in FIG. 5B when a 4-bit chip number starting from zero is provided, such that the chip-enable generation signal is the provided chip number plus one. When the chip number "0000" is provided, for example, a chip-enable generation signal [0001] is generated. When the chip number "0001" is provided, a chip-enable generation signal [0010] is generated. By the same token, the second binary-code-conversion circuit 402 generates a chip-enable generation signal [0011] when the chip number "0010" is provided, and generates a chip-enable generation signal [0100] when the chip number "0011" is provided.

FIG. 6 is an illustrative drawing for explaining a decoding operation of the decoder 50.

The decoder 50 (FIG. 2B) implemented on the memory card 30 having the $2^m$ flash memories 100 decodes a chip-enable generation signal as shown in FIG. 6. Through the decoding operation, a chip-enable signal is generated to enable one of the flash memories 100 specified by the chip number that is issued by the CPU 41.

Namely, the decoder 50 generates a chip-enable signal [0000000000000001] enabling one of the flash memories 100 having the chip number 0 when the second binary-code-conversion circuit 402 supplies the chip-enable generation signal [0001], and generates a chip-enable signal [0000000000000010] enabling one of the flash memories 100 having the chip number 1 when the second binary-code-conversion circuit 402 supplies the chip-enable generation signal [0010]. Further, the decoder 50 generates a chip-enable signal [0000000000000100] enabling one of the flash memories 100 having the chip number 2 when the second binary-code-conversion circuit 402 supplies the chip-enable generation signal [0011].

As is shown in FIGS. 5A and 5B, the first binary-code-conversion circuit 401 and the second binary-code-conversion circuit 402 generate the same bit pattern when the supplied chip number is either "0000" or "0001". When the chip number is "0000", signals having the same bit pattern [0001] are generated. When the chip number is "0001", signals having the same bit pattern [0010] are generated.

As can be seen from FIG. 6, the decoder 50 generates the chip-enable signal [0000000000000001] enabling one of the flash memories 100 having the chip number 0 when the second binary-code-conversion circuit 402 supplies the chip-enable generation signal [0001], and generates the chip-enable signal [0000000000000010] enabling one of the flash memories 100 having the chip number 1 when the second binary-code-conversion circuit 402 supplies the chip-enable generation signal [0010].

Accordingly, the CPU 41 ends up enabling the 0-th one of the flash memories 100 by issuing the chip number "00001", and ends up enabling the 1-st one of the flash memories 100 by issuing the chip number "0001" irrespective of whether the number of the flash memories 100 on the memory card 30 is m or $2^m$.

The one of the flash memories 100 having the chip number 0 (i.e., the first one in the series) may store information about whether the flash memories 100 are to be selected and enabled based on the operation of first binary-code-conversion circuit 401 (hereinafter, referred to as scheme 1), or are to be selected and enabled based on the operation of the second binary-code-conversion circuit 402 (hereinafter, referred to as scheme 2). The one of the flash memories 100 having the chip number 0 may also store information about the number of chips of the flash memories 100. (Information on the memory volume of the flash memories 100 is stored from the first place.) In this case, the CPU 41 can learn the configuration of the flash memories 100 on the memory card 30 without use of a dedicated terminal, and can attend to access control of the flash memories 100 based on what is learned.

Namely, the CPU 41 (the program running on the CPU 41 should be referred to here to be exact, but the CPU 41 is referred to for the sake of simplicity of explanation) obtains the largest address assigned to the flash memories 100 based on the number of chips of the flash memories 100 and the memory volume of one chip, which are learned when the memory card 30 starts an operation thereof. The CPU 41 then notifies a host device such as the digital camera 60 or the personal computer 70 of the obtained largest address, so that the host can control an issued address to be confined within a valid address range of the flash memories 100. Also, the CPU 41 can identify a chip number of one of the flash memories 100 specified by an address that is issued by the host device, thereby enabling the one of the flash memories 100.

FIG. 7 is a flowchart of a process performed by the CPU 41.

As shown in the flowchart, the CPU 41 obtains the information about whether the scheme 1 should be employed or the scheme 2 should be employed when the memory card 30 starts an operation thereof. Based on the information, the CPU 41 set an appropriate selection signal in the selection-signal register 404, thereby controlling whether the chip-enable signal output from the first binary-code-conversion circuit 401 is selected and supplied to the flash memories 100 or the chip-enable generation signal output from the second binary-code-conversion circuit 402 is selected and output to the flash memories 100. In this manner, access control of the flash memories 100 is effected.

In what follows, a case in which a chip-enable signal is supplied to the flash memories 100 in the form of negative logic will be described. In this case, the configuration is the same as that of FIG. 4, and the chip number issued by the CPU 41 starts from zero in the same manner as in the previous case.

FIG. 8A is an illustrative drawing showing a code-conversion process of the first binary-code-conversion circuit 401 in the case of negative logic. FIG. 8B is an illustrative drawing showing a code-conversion process of the second binary-code-conversion circuit 402 in the case of negative logic.

As shown in FIG. 8A, the first binary-code-conversion circuit 401 operations as follows when a 4-bit chip number starting from zero is provided. When the chip number "0000" is supplied, the first binary-codd-conversion circuit 401 generates a chip-enable signal [1110] enabling one of the flash memories 100 having the chip number 0. Further, the first binary-code-conversion circuit 401 generates a chip-enable signal [1101] enabling one of the flash memories 100 having the chip number 1 when the chip number "0001" is provided, and generates a chip-enable signal [1011] enabling one of the flash memories 100 having the chip number 2 when the chip number "0010" is provided. When the chip number "0011" is supplied, the first binarycode-conversion circuit 401 generates a chip-enable signal [0111] enabling one of the flash memories 100 having the chip number 3.

The second binary-code-conversion circuit 402 generates a chip-enable generation signal as shown in FIG. 8B when a 4-bit chip number starting from zero is provided, such that the chip-enable generation signal is obtained by subtracting one from an inverse of the provided chip number. When the chip number "0000" is provided, for example, a chip-enable generation signal [1110] is generated. When the chip number "0001" is provided, a chip-enable generation signal [1101] is generated. By the same token, the second binary-code-conversion circuit 402 generates a chip-enable generation signal [1100] when the chip number "0010" is provided, and generates a chip-enable generation signal [1011] when the chip number "0011" is provided.

FIG. 9 is an illustrative drawing for explaining a decoding operation of the decoder 50 in the case of negative logic.

The decoder 50 implemented on the memory card 30 having the $2^m$ flash memories 100 decodes a chip-enable generation signal as shown in FIG. 9. Through the decoding operation, a chip-enable signal having the form of negative logic is generated to enable one of the flash memories 100 specified by the chip number that is issued by the CPU 41.

As is shown in FIGS. 8A and 8B, the first binary-code-conversion circuit 401 and the second binary-code-conversion circuit 402 generate the same bit pattern when the supplied chip number is either "0000" or "0001". When the chip number is "0000", signals having the same bit pattern [1110] are generated. When the chip number is "0001", signals having the same bit pattern [1101] are generated.

As can be seen from FIG. 9, the decoder 50 generates the chip-enable signal [1111111111111110] enabling one of the flash memories 100 having the chip number 0 when the second binary-code-conversion circuit 402 supplies the chip-enable generation signal [1110], and generates the chip-enable signal [1111111111111101] enabling one of the flash memories 100 having the chip number 1 when the second binary-code-conversion circuit 402 supplies the chip-enable generation signal [1101].

Accordingly, the CPU 41 ends up enabling the 0-th one of the flash memories 100 by issuing the chip number "0000", and ends up enabling the 1-st one of the flash memories 100 by issuing the chip number "0001" irrespective of whether the number of the flash memories 100 on the memory card 30 is m or $2^m$.

The one of the flash memories 100 having the chip number 0 (i.e., the first one in the series) may store information about whether the flash memories 100 are to be selected and enabled based on the operation of first binary-code-conversion circuit 401, or are to be selected and enabled based on the operation of the second binary-code-conversion circuit 402. the one of the flash memories 100 having the chip number 0 may also store information about the number of chips of the flash memories 100. (Information on the memory volume of the flash memories 100 is stored from the first place.) In this case, the CPU 41 can learn the configuration of the flash memories 100 on the memory card 30 without use of a dedicated terminal, and can attend to access control of the flash memories 100 based on what is learned.

In what follows, a description will be given with regard to a case in which a chip-enable signal is supplied to the flash memories 100 in the form of positive logic but the chip number issued by the CPU 41 starts from one. In this case, the configuration is the same as that of FIG. 4. A chip number of the sixteenth chip, however, cannot be represented by 4 bits when m is 4, for example. The chip number of the sixteenth chip is thus represented by using "0000" as a substitute.

FIG. 10A is an illustrative drawing showing a code-conversion process of the first binary-code-conversion circuit 401. FIG. 10B is an illustrative drawing showing a code-conversion process of the second binary-code-conversion circuit 402.

As shown in FIG. 10A, the first binary-code-conversion circuit 401 operations as follows when a 4-bit chip number starting from one is provided. When the chip number "0001" is supplied, the first binary-code-conversion circuit 401 generates a chip-enable signal [0001] enabling one of the flash memories 100 having the chip number 1. Further, the first binary-code-conversion circuit 401 generates a chip-enable signal [0010] enabling one of the flash memories 100 having the chip number 2 when the chip number "0010" is provided, and generates a chip-enable signal [0100] enabling one of the flash memories 100 having the chip number 3 when the chip number "0011" is provided. When the chip number "0100" is supplied, the first binary-code-conversion circuit 401 generates a chip-enable signal [1000] enabling one of the flash memories 100 having the chip number 4.

As will be described later in detail, when the CPU 41 issues a chip number greater than m, the multiplexer 403 selects a chip-enable generation signal generated by the second binary-code-conversion circuit 402. In such a case, therefore, it does not matter what conversion the first binary-code-conversion circuit 401 carries out in response to such large chip numbers.

The second binary-code-conversion circuit 402 generates a chip-enable generation signal as shown in FIG. 10B when a 4-bit chip number starting from one is provided, such that the chip-enable generation signal is equal to the provided chip number. When the chip number "0001" is provided, for example, a chip-enable generation signal [0001] is generated. When the chip number "0010" is provided, a chip-enable generation signal [0010] is generated. By the same token, the second binary-code-conversion circuit 402 generates a chip-enable generation signal [0011] when the chip number "0011" is provided, and generates a chip-enable generation signal [0100] when the chip number "0100" is provided.

FIG. 11 is an illustrative drawing for explaining a decoding operation of the decoder 50.

The decoder 50 implemented on the memory card 30 having the $2^m$ flash memories 100 decodes a chip-enable generation signal as shown in FIG. 11. through the decoding operation, a chip-enable signal is generated to enable one of the flash memories 100 specified by the chip number that is issued by the CPU 41.

As is shown in FIGS. 10A and 10B, the first binary-code-conversion circuit 401 and the second binary-code-conversion circuit 402 generate the same bit pattern when the supplied chip number is either "0001" or "0010". When the chip number is "0001", signals having the same bit pattern [0001] are generated. When the chip number is "0010", signals-having the same bit pattern [0010] are generated.

As can be seen from FIG. 11, the decoder 50 generates the chip-enable signal [0000000000000001] enabling one of the flash memories 100 having the chip number 1 when the second binary-code-conversion circuit 402 supplies the chip-enable generation signal [0001], and generates the chip-enable signal [0000000000000010] enabling one of the flash memories 100 having the chip number 2 when the second binary-code-conversion circuit 402 supplies the chip-enable generation signal [0010].

Accordingly, the CPU 41 ends up enabling the first one of the flash memories 100 by issuing the chip number "0001", and ends up enabling the second one of the flash memories 100 by issuing the chip number "0010" irrespective of whether the number of the flash memories 100 on the memory card 30 is m or $2^m$.

The one of the flash memories 100 having the chip number 1 (i.e., the first one in the series) may store information about whether the flash memories 100 are to be selected and enabled based on the operation of the first binary-code-conversion circuit 401, or are to be selected and enabled based on the operation of the second binary-code-conversion circuit 402. The one of the flash memories 100 having the chip number 1 may also store information about the number of chips of the flash memories 100. (Information on the memory volume of the flash memories 100 is stored from the first place.) In this case, the CPU 41 can learn the configuration of the flash memories 100 on the memory card 30 without use of a dedicated terminal, and can attend to access control of the flash memories 100 based on what is learned.

In what follows, a description will be given with regard to a case in which a chip-enable signal is supplied to the flash memories 100 in the form of negative logic and the chip number issued by the CPU 41 starts from one. The configuration is the same as that of FIG. 4.

FIG. 12A is an illustrative drawing showing a code-conversion process of the first binary-code-conversion circuit 401 in the case of negative logic. FIG. 12B is an illustrative drawing showing a code-conversion process of the second binary-code-conversion circuit 402 in the case of negative logic.

As shown in FIG. 12A, the first binary-code-conversion circuit 401 operations as follows when a 4-bit chip number starting from one is provided. When the chip number "0001" is supplied, the first binary-code-conversion circuit 401 generates a chip-enable signal [1110] enabling one of the flash memories 100 having the chip number 1. Further, the first binary-code-conversion circuit 401 generates a chip-enable signal [1101] enabling one of the flash memories 100 having the chip number 2 when the chip number "0010" is provided, and generates a chip-enable signal [1011] enabling one of the flash memories 100 having the chip number 3 when the chip number "0011" is provided. When the chip number "0100" is supplied, the first binary-code-conversion circuit 401 generates a chip-enable signal [0111] enabling one of the flash memories 100 having the chip number 4.

The second binary-code-conversion circuit 402 generates a chip-enable generation signal as shown in FIG. 12B when a 4-bit chip number starting from one is provided, such that the chip-enable generation signal is an inverse of the provided chip number. When the chip number "0001" is provided, for example, a chip-enable generation signal [1110] is generated. When the chip number "0010" is provided, a chip-enable generation signal [1101] is generated. By the same token, the second binary-code-conversion circuit 402 generates a chip-enable generation signal [1100] when the chip number "0011" is provided, and generates a chip-enable generation signal [1011] when the chip number "0100" is provided. Since a chip number of the sixteenth chip cannot be represented by 4 bits, a chip-enable generation signal [0000] is generated.

FIG. 13 is an illustrative drawing for explaining a decoding operation of the decoder 50 in the case of negative logic.

The decoder 50 implemented on the memory card 30 having the $2^m$ flash memories 100 decodes a chip-enable generation signal as shown in FIG. 13. Through the decoding operation, a chip-enable signal having the form of negative logic is generated to enable one of the flash memories 100 specified by the chip number that is issued by the CPU 41.

As is shown in FIGS. 12A and 12B, the first binary-code-conversion circuit 401 and the second binary-code-conversion circuit 402 generate the same bit pattern when the supplied chip number is either "0001" or "0010". When the chip number is "0001", signals having the same bit pattern [1110] are generated. When the chip number is "0010", signals having the same bit pattern [1101] are generated.

As can be seen from FIG. 13, the decoder 50 generates the chip-enable signal [1111111111111110] enabling one of the flash memories 100 having the chip number 1 when the second binary-code-conversion circuit 402 supplies the chip-enable generation signal [1110], and generates the chip-enable signal [1111111111111101] enabling one of the flash memories 100 having the chip number 2 when the second binary-code-conversion circuit 402 supplies the chip-enable generation signal [1101].

Accordingly, the CPU 41 ends up enabling the first one of the flash memories 100 by issuing the chip number "0001", and ends up enabling the second one of the flash memories 100 by issuing the chip number "0010" irrespective of whether the number of the flash memories 100 on the memory card 30 is m or $2^m$.

The one of the flash memories 100 having the chip number 1 (i.e., the first one in the series) may store information about whether the flash memories 100 are to be selected and enabled based on the operation of the first binary-code-conversion circuit 401, or are to be selected and enabled based on the operation of the second binary-code-conversion circuit 402. The one of the flash memories 100 having the chip number 1 may also store information about the number of chips of the flash memories 100. (Information on the memory volume of the flash memories 100 is stored from the first place.) In this case, the CPU 41 can learn the configuration of the flash memories 100 on the memory card 30 without use of a dedicated terminal, and can attend to access control of the flash memories 100 based on what is learned.

FIG. 14 is a block diagram of the chip-enable-signal generation circuit 43 according to another embodiment of the present invention.

In this embodiment, the chip-enable-signal generation circuit 43 is equipped with a function to generate a chip-enable signal with respect to the m flash memories 100 implemented on the memory card 30 which is provided as part of the digital camera 60, and is equipped with a function to generate a chip-enable signal with respect to the $2^{m+n}$ flash memories 100 implemented on the memory card 30 which is provided as part of the personal computer 70.

The chip-enable-signal generation circuit 43 includes an operation circuit 500, a first binary-code-conversion circuit 501, a second binary-code-conversion circuit 502, a lower-bit multiplexer 503, an upper-bit multiplexer 504, and a selection-signal register 505. The operation circuit 500 calculates a remainder (m bits) and a quotient (n bits) obtained by an operation dividing a (m+n)-bit chip number by $2^m$. Here, the chip number is stored in the chip-number register 400 of the flash-card controller 40. The first binary-code-conversion circuit 501 applies code-conversion processing to the remainder and the quotient so as to generate a (m+n)-bit chip-enable signal with respect to the m flash memories 100. The second binary-code-conversion circuit 502 applies code-conversion processing to the remainder and the quotient so as to generate a (m+n)-bit chip-enable generation signal with respect to the $2^{m+n}$ flash memories 100. The lower-bit multiplexer 503 selects either m lower bits of the chip-enable signal from the first binary-code-conversion circuit 501 or m lower bits of the chip-enable generation signal from the second binary-code-conversion circuit 502, and outputs the selected one to the flash memories 100. In synchronism with the lower-bit multiplexer 503, the upper-bit multiplexer 504 selects either n upper bits of the chip-enable signal from the first binary-code-conversion circuit 501 or n upper bits of the chip-enable generation signal from the second binary-code-conversion circuit 502, and outputs the selected one to the flash memories 100. The selection-signal register 505 stores selection signals that are respectively supplied to the lower-bit multiplexer 503 and the upper-bit multiplexer 504.

Figure 15A:
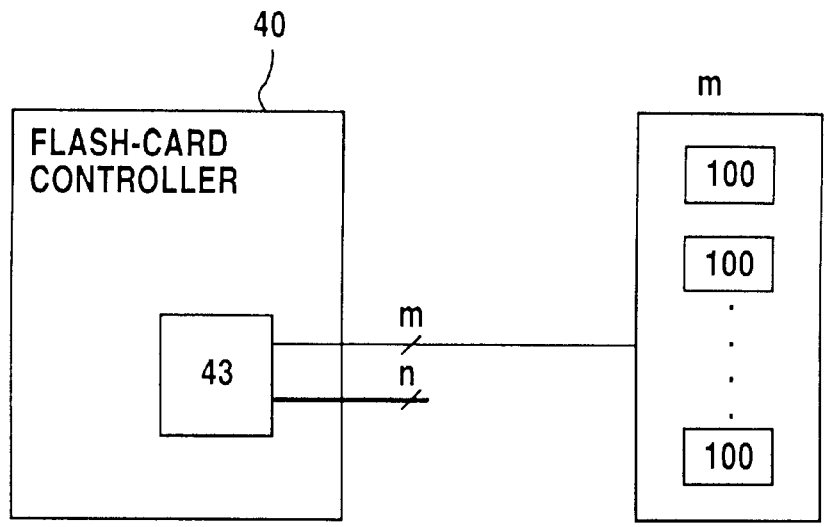
FIGS. 15A and 15B are illustrative drawings showing connections between a controller and flash memories.
Figure 15B:
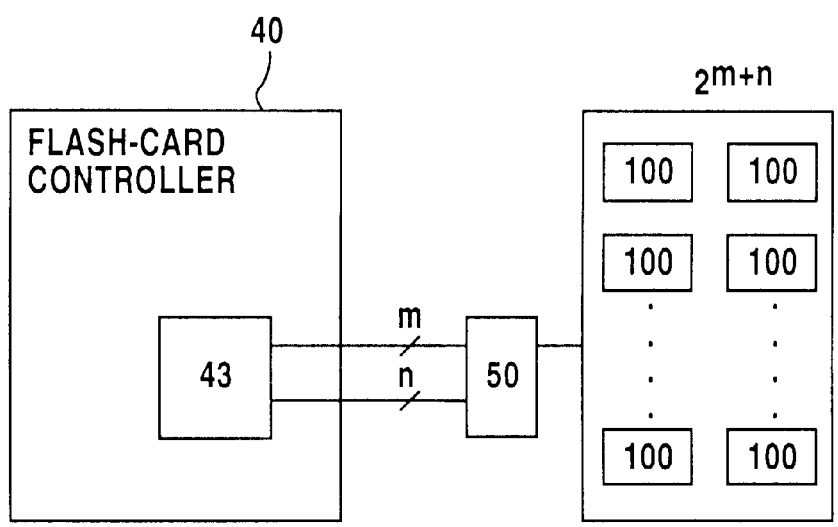

FIGS. 15A and 15B are illustrative drawings showing connections between the controller and the flash memories.

As shown in FIGS. 15A and 15B, the n bit signal output of the upper-bit multiplexer 504 is not used for any purposes when only m flash memories 100 are provided.

FIG. 16 is an illustrative drawing for explaining a remainder and a quotient obtained from a chip number. FIG. 17A is an illustrative drawing showing a code-conversion process of the first binary-code-conversion circuit 501. FIG. 17B is an illustrative drawing showing a code-conversion process of the second binary-code-conversion circuit 502.

FIG. 16 and FIGS. 17A and 17B show a case in which the chip number stored in the chip-number register 400 of the flash-card controller 40 starts from zero, and m and n are 4 and 2, respectively. The operation circuit 500 obtains the remainder and the quotient as shown in FIG. 16. When the chip-enable signal supplied to the flash memories 100 is to be represented by positive logic, the first binary-code-conversion circuit 501 and the second binary-code-conversion circuit 502 perform the code-conversion processes as shown in FIG. 17A and FIG. 17B, respectively.

When a chip number 0 is stored in the chip-number register 400, the operation circuit 500 outputs a remainder [0000] and a quotient [00]. In response, the first binary-code-conversion circuit 501 generates a chip-enable signal having 4 lower bits thereof equal to [0001] for enabling one of the flash memories 100 having the chip number 0, with 2 upper bits of the chip-enable signal being equal to the quotient [00]. When a chip number 1 is stored in the chip-number register 400, the operation circuit 500 outputs a remainder [0001] and a quotient [00]. In response, the first binary-code-conversion circuit 501 generates a chip-enable signal having 4 lower bits thereof equal to [0010] for enabling one of the flash memories 100 having the chip number 1, with 2 upper bits of the chip-enable signal being equal to the quotient [00].

When a chip number 2 is stored in the chip-number register 400, the operation circuit 500 outputs a remainder [0010] and a quotient [00]. In response, the first binary-code-conversion circuit 501 generates a chip-enable signal having 4 lower bits thereof equal to [0100] for enabling one of the flash memories 100 having the chip number 2, with 2 upper bits of the chip-enable signal being equal to the quotient [00]. When a chip number 3 is stored in the chip-number register 400, the operation circuit 500 outputs a remainder [0011] and a quotient [00]. In response, the first binary-code-conversion circuit 501 generates a chip-enable signal having 4 lower bits thereof equal to [1000] for enabling one of the flash memories 100 having the chip number 3, with 2 upper bits of the chip-enable signal being equal to the quotient [00].

The second binary-code-conversion circuit 502 generates a chip-enable generation signal as shown in FIG. 17B based on a remainder and a quotient supplied from the operation circuit 500 when a chip number starting from zero is stored in the chip-number register 400, such that the chip-enable generation signal has 4 lower bits thereof equal to the remainder plus one and 2 upper bits thereof equal to the quotient. When the chip number 0 is provided, for example, a chip-enable generation signal [00,0001] is generated. When the chip number 1 is provided, a chip-enable generation signal [00,0010] is generated. By the same token, the second binary-code-conversion circuit 502 generates a chip-enable generation signal [00,0011] when the chip number 2 is provided, and generates a chip-enable generation signal [00,0100] when the chip number 3 is provided.

FIG. 18 is an illustrative drawing for explaining a decoding operation of the decoder 50, The decoder 50 implemented on the memory card 30 having the $2^{m+n}$ flash memories 100 decodes a chip-enable generation signal as shown in FIG. 18. Through the decoding operation, a chip-enable signal is generated to enable one of the flash memories 100 specified by the chip number that is issued by the CPU 41.

As is shown in FIGS. 17A and 17B, the first binary-code-conversion circuit 501 and the second binary-code-conversion circuit 502 generate the same bit pattern when the supplied chip number is either 0 or 1. When the chip number is 0, signals having the same bit pattern [00,0001] are generated. When the chip number is 1, signals having the same bit pattern [00,0010] are generated.

As can be seen from FIG. 18, the decoder 50 generates the chip-enable signal [0 · · · 01] enabling one of the flash memories 100 having the chip number 0 when the second binary-code-conversion circuit 502 supplies the chip-enable generation signal [00,0001], and generates the chip-enable signal [0 · · · 010] enabling one of the flash memories 100 having the chip number 1 when the second binary-code-conversion circuit 502 supplies the chip-enable generation signal [00,0010].

Accordingly, the CPU 41 ends up enabling the 0-th one of the flash memories 100 by issuing the chip number 0, and ends up enabling the 1-st one of the flash memories 100 by issuing the chip number 1 irrespective of whether the number of the flash memories 100 on the memory card 30 is m or $2^{m+n}$.

The one of the flash memories 100 having the chip number 0 (i.e., the first one in the series) may store information about whether the flash memories 100 are to be selected and enabled based on the operation of the first binary-code-conversion circuit 501 (hereinafter, referred to as scheme 1), or are to be selected and enabled based on the operation of the second binary-code-conversion circuit 502 (hereinafter, referred to as scheme 2). The one of the flash memories 100 having the chip number 0 may also store information about the number of chips of the flash memories 100. (Information on the memory volume of the flash memories 100 is stored from the first place.) In this case, the CPU 41 can learn the configuration of the flash memories 100 on the memory card 30 without use of a dedicated terminal, and can attend to access control of the flash memories 100 based on what is learned.

In what follows, a case in which a chip-enable signal is supplied to the flash memories 100 in the form of negative logic will be described In this case, the configuration is the same as that of FIG. 14, and the chip number issued by the CPU 41 starts from zero in the same manner as in the previous case.

FIG. 19A is an illustrative drawing showing a code-conversion process of the first binary-code-conversion circuit 501 in the case of negative logic. FIG. 19B is an illustrative drawing showing a code-conversion process of the second binary-code-conversion circuit 502 in the case of negative logic.

When a chip number 0 is stored in the chip-number register 400, the operation circuit 500 outputs a remainder [0000] and a quotient [00]. In response, the first binary-code-conversion circuit 501 generates a chip-enable signal having 4 lower bits thereof equal to [1110] for enabling one of the flash memories 100 having the chip number 0, with 2 upper bits of the chip-enable signal being equal to the quotient [00]. When a chip number 1 is stored in the chip-number register 400, the operation circuit 500 outputs a remainder [0001] and a quotient [00]. In response, the first binary-code-conversion circuit 501 generates a chip-enable signal having 4 lower bits thereof equal to [1101] for enabling one of the flash memories 100 having the chip number 1, with 2 upper bits of the chip-enable signal being equal to the quotient [00].

When a chip number 2 is stored in the chip-number register 400, the operation circuit 500 outputs a remainder [0010] and a quotient [00]. In response, the first binary-code-conversion circuit 501 generates a chip-enable signal having 4 lower bits thereof equal to [1011] for enabling one of the flash memories 100 having the chip number 2, with 2 upper bits of the chip-enable signal being equal to the quotient [00]. When a chip number 3 is stored in the chip-number register 400, the operation circuit 500 outputs a remainder [0011] and a quotient [00]. In response, the first binary-code-conversion circuit 501 generates a chip-enable signal having 4 lower bits thereof equal to [0111] for enabling one of the flash memories 100 having the chip number 3, with 2 upper bits of the chip-enable signal being equal to the quotient [00].

The second binary-code-conversion circuit 502 generates a chip-enable generation signal as shown in FIG. 19B based on a remainder and a quotient supplied from the operation circuit 500 when a chip number starting from zero is stored in the chip-number register 400, such that the chip-enable generation signal has 4 lower bits thereof equal to an inverse of the remainder minus one and 2 upper bits thereof equal to the quotient. When the chip number 0 is provided, for example, a chip-enable generation signal [00,1110] is generated. When the chip number 1 is provided, a chip-enable generation signal [00,1101] is generated. By the same token, the second binary-code-conversion circuit 502 generates a chip-enable generation signal [00,1100] when the chip number 2 is provided, and generates a chip-enable generation signal [00,1011] when the chip number 3 is provided.

FIG. 20 is an illustrative drawing for explaining a decoding operation of the decoder 50 in the case of negative logic.

The decoder 50 implemented on the memory card 30 having the $2^{m+n}$ flash memories 100 decodes a chip-enable generation signal as shown in FIG. 20. Through the decoding operation, a chip-enable signal is generated to enable one of the flash memories 100 specified by the chip number that is issued by the CPU 41.

As is shown in FIGS. 19A and 19B, the first binary-code-conversion circuit 501 and the second binary-code-conversion circuit 502 generate the same bit pattern when the supplied chip number is either 0 or 1. When the chip number is 0, signals having the same bit pattern [00,1110] are generated. When the chip number is 1, signals having the same bit pattern [00,1101] are generated.

As can be seen from FIG. 20, the decoder 50 generates the chip-enable signal [1 · · · 10] enabling one of the flash memories 100 having the chip number 0 when the second binary-code-conversion circuit 502 supplies the chip-enable generation signal [00,1110], and generates the chip-enable signal [1 · · · 101] enabling one of the flash memories 100 having the chip number 1 when the second binary-code-conversion circuit 502 supplies the chip-enable generation signal [00,1101].

Accordingly, the CPU 41 ends up enabling the 0-th one of the flash memories 100 by issuing the chip number 0, and ends up enabling the 1-st one of the flash memories 100 by issuing the chip number 1 irrespective of whether the number of the flash memories 100 on the memory card 30 is m or $2^{m+n}$.

The one of the flash memories 100 having the chip number 0 (i.e., the first one in the series) may store information about whether the flash memories 100 are to be selected and enabled based on the scheme 1 or based on the scheme 2, and may also store information about the number of chips of the flash memories 100. (Information on the memory volume of the flash memories 100 is stored from the first place.) In this case, the CPU 41 can learn the configuration of the flash memories 100 on the memory card 30 without use of a dedicated terminal, and can attend to access control of the flash memories 100 based on what is learned.

In what follows, a description will be given with regard to a case in which a chip-enable signal is supplied to the flash memories 100 in the form of positive logic but the chip number issued by the CPU 41 starts from one. In this case, the configuration is the same as that of FIG. 14. A chip number of the sixty-fourth chip, however, cannot be represented by 6 bits when m and n are 4 and 2, respectively. The chip number of the sixty-fourth chip is thus represented by using "000000" as a substitute.

When the chip number issued by the CPU 41 starts from one, the operation circuit 500 obtains a remainder (m bits) and a quotient (n bits) by dividing the chip number minus one by $2^m$. FIG. 21 is an illustrative drawing showing a set of a remainder and a quotient obtained from a set of chip numbers.

FIG. 22A is an illustrative drawing showing a code-conversion process of the first binary-code-conversion circuit 501. FIG. 22B is an illustrative drawing showing a code-conversion process of the second binary-code-conversion circuit 502.

When a chip number 1 is stored in the chip-number register 400, the operation circuit 500 outputs a remainder [0000] and a quotient [00]. In response, the first binary-code-conversion circuit 501 generates a chip-enable signal having 4 lower bits thereof equal to [0001] for enabling one of the flash memories 100 having the chip number 1, with 2 upper bits of the chip-enable signal being equal to the quotient [00]. When a chip number 2 is stored in the chip-number register 400, the operation circuit 500 outputs a remainder [0001] and a quotient [00]. In response, the first binary-code-conversion circuit 501 generates a chip-enable signal having 4 lower bits thereof equal to [0010] for enabling one of the flash memories 100 having the chip number 2, with 2 upper bits of the chip-enable signal being equal to the quotient [00].

When a chip number 3 is stored in the chip-number register 400, the operation circuit 500 outputs a remainder [0010] and a quotient [00]. In response, the first binary-code-conversion circuit 501 generates a chip-enable signal having 4 lower bits thereof equal to [0100] for enabling one of the flash memories 100 having the chip number 3, with 2 upper bits of the chip-enable signal being equal to the quotient [00]. When a chip number 4 is stored in the chip-number register 400, the operation circuit 500 outputs a remainder [0011] and a quotient [00]. In response, the first binary-code-conversion circuit 501 generates a chip-enable signal having 4 lower bits thereof equal to [1000] for enabling one of the flash memories 100 having the chip number 4, with 2 upper bits of the chip-enable signal being equal to the quotient [00].

The second binary-code-conversion circuit 502 generates a chip-enable generation signal as shown in FIG. 22B based on a remainder and a quotient supplied from the operation circuit 500 when a chip number starting from one is stored in the chip-number register 400, such that the chip-enable generation signal has 4 lower bits thereof equal to the remainder plus one and 2 upper bits thereof equal to the quotient. When the chip number 1 is provided, for example, a chip-enable generation signal [00,0001] is generated. When the chip number 2 is provided, a chip-enable generation signal [00,0010] is generated. By the same token, the second binary-code-conversion circuit 502 generates a chip-enable generation signal [00,0011] when the chip number 3 is provided, and generates a chip-enable generation signal [00,0100] when the chip number 4 is provided.

FIG. 23 is an illustrative drawing for explaining a decoding operation of the decoder 50.

The decoder 50 implemented on the memory card 30 having the $2^{m+n}$ flash memories 100 decodes a chip-enable generation signal as shown in FIG. 23. Through the decoding operation, a chip-enable signal is generated to enable one of the flash memories 100 specified by the chip number that is issued by the CPU 41.

As is shown in FIGS. 22A and 22B, the first binary-code-conversion circuit 501 and the second binary-code-conversion circuit 502 generate the same bit pattern when the supplied chip number is either 1 or 2. When the chip number is 1, signals having the same bit pattern [00,0001] are generated. When the chip number is 2, signals having the same bit pattern [00,0010] are generated.

As can be seen from FIG. 23, the decoder 50 generates the chip-enable signal [0 · · · 01] enabling one of the flash memories 100 having the chip number 1 when the second binary-code-conversion circuit 502 supplies the chip-enable generation signal [00,0001], and generates the chip-enable signal [0 · · · 010] enabling one of the flash memories 100 having the chip number 2 when the second binary-code-conversion circuit 502 supplies the chip-enable generation signal [00,0010].

Accordingly, the CPU 41 ends up enabling the first one of the flash memories 100 by issuing the chip number 1, and ends up enabling the second one of the flash memories 100 by issuing the chip number 2 irrespective of whether the number of the flash memories 100 on the memory card 30 is m or $2^{m+n}$.

The one of the flash memories 100 having the chip number 1 (i.e., the first one in the series) may store information about whether the flash memories 100 are to be selected and enabled based on the scheme 1 or based on the scheme 2, and may also store information about the number of chips of the flash memories 100. (Information on the memory volume of the flash memories 100 is stored from the first place.) In this case, the CPU 41 can learn the configuration of the flash memories 100 on the memory card 30 without use of a dedicated terminal, and can attend to access control of the flash memories 100 based on what is learned.

In what follows, a description will be given with regard to a case in which a chip-enable signal is supplied to the flash memories 100 in the form of negative logic and the chip number issued by the CPU 41 starts from one. The configuration is the same as that of FIG. 14.

When the chip number issued by the CPU 41 starts from one, the operation circuit 500 obtains a remainder (m bits) and a quotient (n bits) by dividing the chip number minus one by $2^m$. Namely, the remainder and the quotient are obtained as shown in FIG. 21.

FIG. 24A is an illustrative drawing showing a code-conversion process of the first binary-code-conversion circuit 501 in the case of negative logic. FIG. 24B is an illustrative drawing showing a code-conversion process of the second binary-code-conversion circuit 502 in the case of negative logic.

When a chip number 1 is stored in the chip-number register 400, the operation circuit 500 outputs a remainder [0000] and a quotient [00]. In response, the first binary-code-conversion circuit 501 generates a chip-enable signal having 4 lower bits thereof equal to [1110] for enabling one of the flash memories 100 having the chip number 1, with 2 upper bits of the chip-enable signal being equal to the quotient [00]. When a chip number 2 is stored in the chip-number register 400, the operation circuit 500 outputs a remainder [0001] and a quotient [00]. In response, the first binary-code-conversion circuit 501 generates a chip-enable signal having 4 lower bits thereof equal to [1101] for enabling one of the flash memories 100 having the chip number 2, with 2 upper bits of the chip-enable signal being equal to the quotient [00].

When a chip number 3 is stored in the chip-number register 400, the operation circuit 500 outputs a remainder [0010] and a quotient [00]. In response, the first binary-code-conversion circuit 501 generates a chip-enable signal having 4 lower bits thereof equal to [1011] for enabling one of the flash memories 100 having the chip number 3, with 2 upper bits of the chip-enable signal being equal to the quotient [00]. When a chip number 4 is stored in the chip-number register 400, the operation circuit 500 outputs a remainder [0011] and a quotient [00]. In response, the first binary-code-conversion circuit 501 generates a chip-enable signal having 4 lower bits thereof equal to [0111] for enabling one of the flash memories 100 having the chip number 4, with 2 upper bits of the chip-enable signal being equal to the quotient [00].

The second binary-code-conversion circuit 502 generates a chip-enable generation signal as shown in FIG. 22B based on a remainder and a quotient supplied from the operation circuit 500 when a chip number starting from one is stored in the chip-number register 400, such that the chip-enable generation signal has 4 lower bits thereof equal to an inverse of the remainder minus one and 2 upper bits thereof equal to the quotient. When the chip number 1 is provided, for example, a chip-enable generation signal [00,1110] is generated. When the chip number 2 is provided, a chip-enable generation signal [00,1101] is generated. By the same token, the second binary-code-conversion circuit 502 generates a chip-enable generation signal [00,1100] when the chip number 3 is provided, and generates a chip-enable generation signal [00,1011] when the chip number 4 is provided.

FIG. 25 is an illustrative drawing for explaining a decoding operation of the decoder 50 in the case of negative logic.

The decoder 50 implemented on the memory card 30 having the $2^{m+n}$ flash memories 100 decodes a chip-enable generation signal as shown in FIG. 25. Through the decoding operation, a chip-enable signal is generated to enable one of the flash memories 100 specified by the chip number that is issued by the CPU 41.

As is shown in FIGS. 24A and 24B, the first binary-code-conversion circuit 501 and the second binary-code-conversion circuit 502 generate the same bit pattern when the supplied chip number is either 1 or 2. When the chip number is 1, signals having the same bit pattern [00,1110] are generated. When the chip number is 2, signals having the same bit pattern [00,1101] are generated.

As can be seen from FIG. 25, the decoder 50 generates the chip-enable signal [1 · · · 10] enabling one of the flash memories 100 having the chip number 1 when the second binary-code-conversion circuit 502 supplies the chip-enable generation signal [00,1110], and generates the chip-enable signal [1 · · · 101] enabling one of the flash memories 100 having the chip number 2 when the second binary-code-conversion circuit 502 supplies the chip-enable generation signal [00,1101].

Accordingly, the CPU 41 ends up enabling the first one of the flash memories 100 by issuing the chip number 1, and ends up enabling the second one of the flash memories 100 by issuing the chip number 2 irrespective of whether the number of the flash memories 100 on the memory card 30 is m or $2^{m+n}$.

The one of the flash memories 100 having the chip number 1 (i.e., the first one in the series) may store information about whether the flash memories 100 are to be selected and enabled based on the scheme 1 or based on the scheme 2, and may also store information about the number of chips of the flash memories 100. (Information on the memory volume of the flash memories 100 is stored from the first place.) In this case, the CPU 41 can learn the configuration of the flash memories 100 on the memory card 30 without use of a dedicated terminal, and can attend to access control of the flash memories 100 based on what is learned.

As described above, the memory card 30 according to the present invention can carry thereon the total number m of the flash memories 100 or the total number $2^m$ of the flash memories 100. When the m flash memories 100 are implemented, an chip-enable signal having m bits is used for the chip-enable operation. When the $2^m$ flash memories 100 are implemented, an chip-enable generation signal having m bits is decoded to generate a chip-enable signal having $2^m$ bits, which is then used for the chip-enable operation. To this end, either the chip number 0 or the chip number 1 (or either the chip number 1 or the chip number 2 when the chip number starts from one) is issued in order to insure that the one of the flash memories 100 having the issued chip number is accessed regardless of which one of the chip configurations is employed. This chip having the issued chip number stores information on the chip configuration, thereby informing of the actually employed chip configuration.

Further, the memory card 30 according to the present invention can carry thereon the total number m of the flash memories 100 or the total number $2^{m+n}$ of the flash memories 100. When the m flash memories 100 are implemented, an chip-enable signal having m bits is used for the enable operation. When the $2^{m+n}$ flash memories 100 are implemented, an chip-enable generation signal having m+n bits is decoded to generate a chip-enable signal having $2^{m+n}$ bits, which is then used for the enable operation. To this end, either the chip number 0 or the chip number 1 (or either the chip number 1 or the chip number 2 when the chip number starts from one) is issued in order to insure that the one of the flash memories 100 having the issued chip number is accessed regardless of which one of the chip configurations is employed. This chip having the issued chip number stores information on the chip configuration, thereby informing of the actually employed chip configuration.

The above embodiments have been provided for the purpose of describing the invention, and are not intended to limit the scope of the present invention. For example, the configuration of FIG. 14 uses a quotient output from the operation circuit 500 as n upper bits of the signal output for the first binary-code-conversion circuit 501 and the second binary-code-conversion circuit 502. However, the n upper bits need to be the same between the first binary-code-conversion circuit 501 and the second binary-code-conversion circuit 502 only when the chip number 0 or 1 (or the chip number 1 or 2 when it starts from one) is issued in the configuration of FIG. 14.. The present invention is not limited to this particular configuration.

Further, the embodiments of FIG. 4 and FIG. 14 have been described with reference to an example in which a chip-enable signal is generated for the flash memories 100. It should be noted, however, that these embodiments are equally applicable to other types of memories or even applicable to other types of chips which are not memories.

According to the embodiment of FIG. 4, the CPU 41 can enable the first one of the flash memories 100 having the chip number 0 by issuing the chip number 0 regardless of whether the number of the flash memories 100 on the memory card 30 is m or $2^m$. According to the embodiment of FIG. 14, the CPU 41 can enable the first one of the flash memories 100 having the chip number 0 by issuing the chip number 0 regardless of whether the number of the flash memories 100 on the memory card 30 is m or $2^{m+n}$.

The first one of the flash memories 100 having the chip number 0 may store information about whether the flash memories 100 are to be selected and enabled based on the operation of the first binary-code-conversion circuit 401 or 501, or are to be selected and enabled based on the operation of the second binary-code-conversion circuit 402 or 502. The first one of the flash memories 100 having the chip number 0 may also store information about the number of chips of the flash memories 100. (Information on the memory volume of the flash memories 100 is supposed to be stored from the first place.) In this case, the CPU 41 can learn the configuration of the flash memories 100 on the memory card 30 without use of a dedicated terminal, and can attend to access control of the flash memories 100 based on what is learned.

Namely, the CPU 41 obtains the largest address assigned to the flash memories 100 based on the number of chips of the flash memories 100 and the memory volume of one chip. The CPU 41 then notifies a host device such as the digital camera 60 or the personal computer 70 of the obtained largest address, so that the host can make sure that an issued address falls within a valid address range of the flash memories 100. Also, the CPU 41 can identify a chip number of one of the flash memories 100 specified by an address that is issued by the host device, thereby enabling the one of the flash memories 100.

Based on the information about which one of the enabling schemes is employed, the CPU 41 sets a selection signal in the selection-signal register 404 or the selection-signal register 505. The selection signal determines whether a chip-enable signal of the first binary-code-conversion circuit 401 or 501 is selected and output to the flash memories 100 or a chip-enable generation signal of the second binary-code-conversion circuit 402 or 502 is selected and output to the flash memories 100 (via the decoder 50). In this manner, access to the flash memories 100 is appropriately controlled.

FIG. 26 is an illustrative drawing showing an example of various pieces of information stored in the first one of the flash memories 100.

The first one of the flash memories 100 having the chip number 0 stores the information about whether the flash memories 100 are controlled based on the scheme 1 or are controlled based on the scheme 2, and further stores the information on the number of chips of the flash memories 100 implemented on the memory card 30. In addition, the first one of the flash memories 100 may store control information about a time that passes before entering a low-power-consumption mode, control information about a code that is used for notifying a host that data requested for access has been deleted, control information regarding whether specified bits in a register are valid or invalid, identification information about card specifications, identification information about a method of generating an internal table, etc.

In general, the scheme 1 is used if the number of the flash memories 100 is small, and the scheme 2 is employed if the number of the flash memories 100 is large. Based on this general proposition, the number of the flash memories 100 may be checked in order to decide whether to employ the scheme 1 or the scheme 2. In such a case, there is no need to store the information that is a direct indication of whether the flash memories 100 are controlled based on the scheme 1 or are controlled based on the scheme 2.

The various pieces of information stored in the first one of the flash memories 100 having the chip number 0 may be installed by an external setting device when the memory card 30 is shipped out from a factory.

Figure 27:
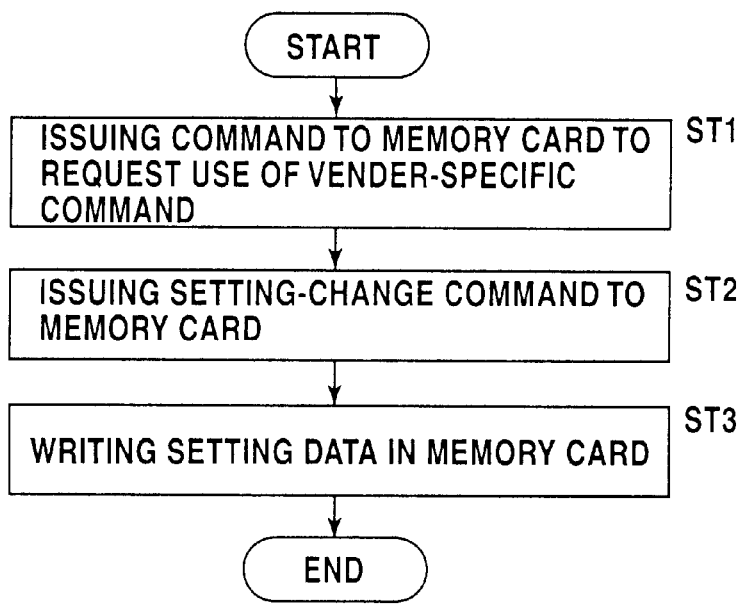
FIG. 27 is an illustrative drawing showing a flowchart of a process performed by an external setting device.
Figure 28:
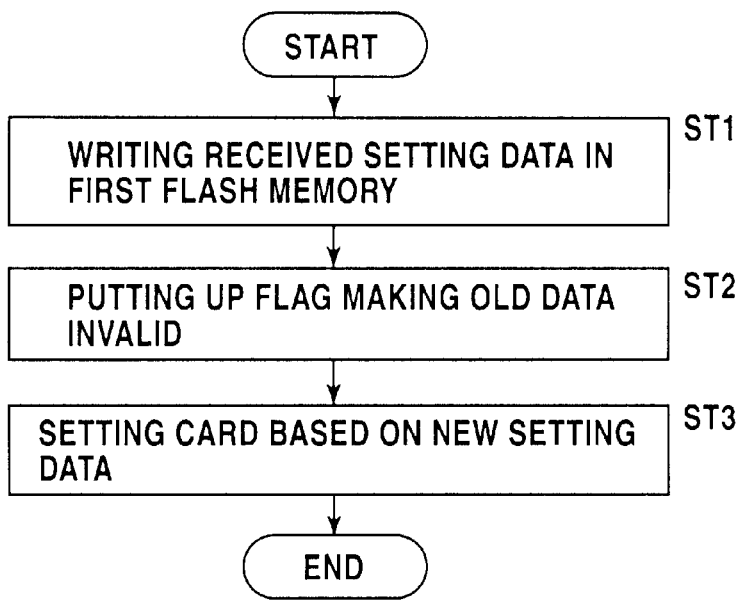
FIG. 28 is an illustrative drawing showing a flowchart of a process performed by the CPU in synchronism with operations of the external setting device.

FIG. 27 is an illustrative drawing showing a flowchart of a process performed by the external setting device. FIG 28 is an illustrative drawing showing a flowchart of a process performed by the CPU 41 in synchronism with the operation of the external setting device.

When a request for writing various pieces of information in the first one of the flash memories 100 is issued by an operator, the setting device issues a command requesting the memory card 30 to accept a vendor specific command as shown in FIG. 27. Here, the vendor specific command is a command provided in addition to a set of standard commands such as a read command. Upon acceptance of the request, the setting device sends a setting-change command to the memory card 30 so as to request changes to be made to the settings of various pieces of information stored in the flash memories 100. When this command is accepted, the setting device sends setting data input by the operator or the like to the memory card 30, thereby writing the setting data in the memory card 30.

In response to these operations of the setting device, the CPU 41 writes the setting data sent from the setting device in the first one of the flash memories 100 having the chip number 0 as shown in FIG. 28. Here, the setting data is written in a blank block of the first one of the flash memories 100. Then, the CPU 41 puts up a flag indicative of an invalid status of old setting data, which is obsolete in light of the new setting data sent from the setting device. Finally, the newly written setting data is stored in a register that is provided in an SRAM area of the CPU 41, thereby setting the memory card 30 in accordance with the newly provided setting data.

In this manner, the external setting device stores the various pieces of information in the first one of the flash memories 100 having the chip number 0 when the memory card 30 is shipped out from a factory, for example.

Figure 29:
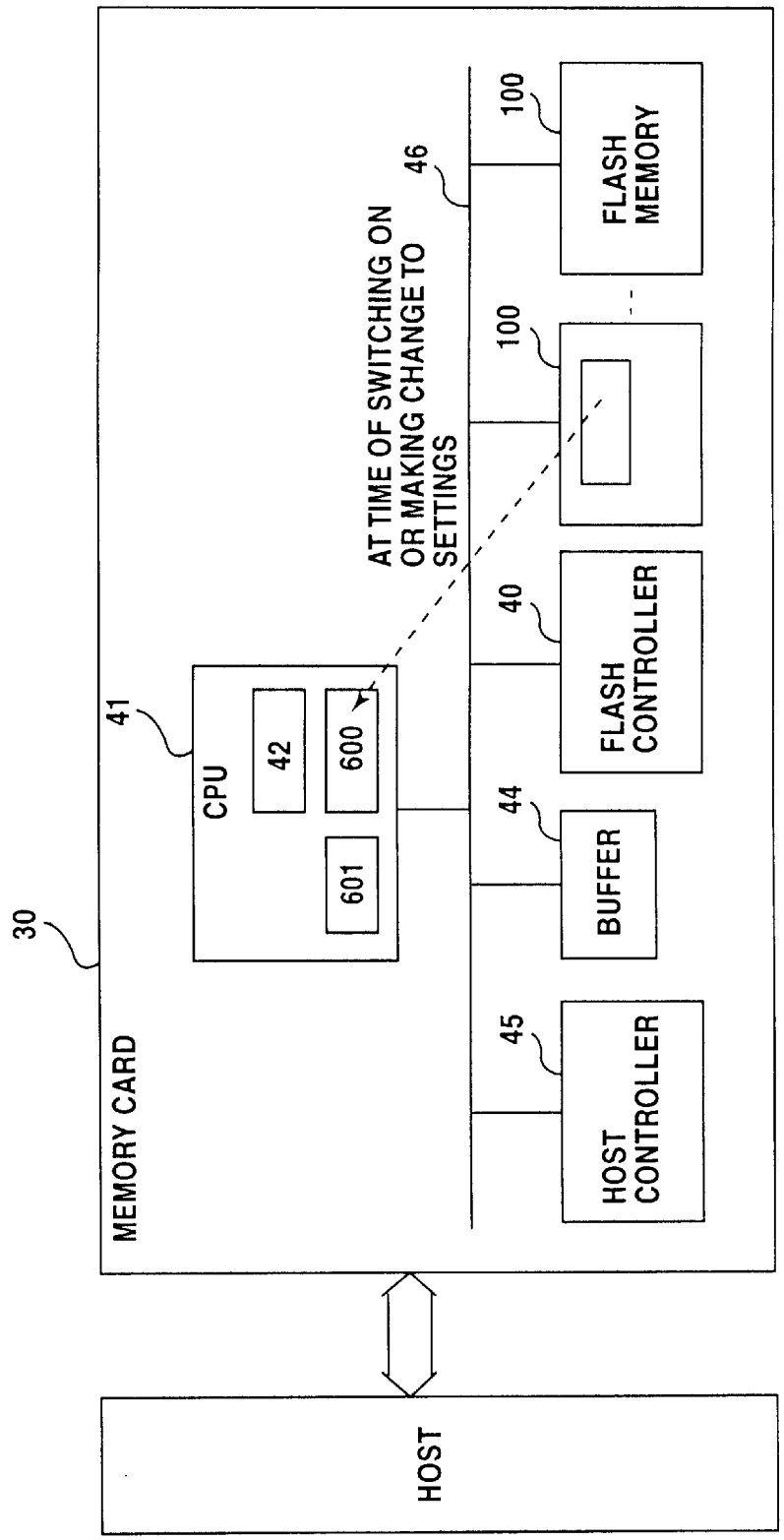
FIG. 29 is an illustrative drawing showing operations of the memory card.

FIG. 29 is an illustrative drawing, showing operations of the memory card 30.

When the memory card 30 starts an operation thereof, the various pieces of information stored in the first one of the flash memories 100 is written in a register that is provided in an SRAM area 600 of the CPU 41 as shown in FIG. 29. The resister has a specific address assigned thereto in the SRAM area 600, and the CPU 41 accesses the register having this specific address in order to acquire the various pieces of information stored in the first one of the flash memories 100.

In what follows, a description will be given with regard to the manner in which the various pieces of information stored in the register of the SRAM area 600 are used. As described in the above, the various pieces of information are originally stored in the first one of the flash memories 100 having the chip number 0.

1) Information about Scheme to be Used

As previously described, at the time when the memory card 30 starts an operation thereof, the CPU 41 acquires the information about whether the scheme 1 is employed or the scheme 2 is employed. The CPU 41 sets a selection signal in the selection-signal register 404 (or 505) to select the chip-enable signal generated by the first binary-code-conversion circuit 401 (or 501) when the scheme 1 is employed, and sets a selection signal in the selection-signal register 404 (or 505) to select the chip-enable generation signal generated by the second binary-code-conversion circuit 402 (or 502) when the scheme 2 is employed. In this manner, access to the flash memories 100 is effected.

2) Number of chips in Flash Memories

As previously described, at the time when the memory card 30 starts an operation thereof, the CPU 41 acquires the information about the number of implemented chips of the flash memories 100 as well as the memory volume of each chip of the flash memories 100 (provided as default). Based on the number of chips and the memory volume, the CPU 41 obtains the largest address assigned to the flash memories 100, and, then, informs the digital camera 60 or the personal computer 70 of the obtained largest address. Further, the CPU 41 identifies a chip number of a chip of the flash memories 100 specified by an address when the host device specifies this address for access request, thereby enabling the specified chip of the flash memories 100.

3) Time that Passes Before Entering Low-Power-Consumption Mode

The CPU 41 starts a process of counting time after completing a given process responding to a request from the digital camera 60 or the personal computer 70. When receiving a request for a next process, the CPU 41 resets the counting of time. If the counted time exceeds a predetermined time length, however, the CPU 41 carries out a process for entering a low-power-consumption mode.

The CPU 41 uses the information about the time that passes before entering a low-power-consumption mode when the information is stored in the register of the SRAM area 600, and determines based on this information whether to enter the low-power-consumption mode. This configuration makes it easy to change the time length that passes before lapsing into the low-power-consumption mode.

Namely, the time that passes before entering the low-power-consumption mode is not specified as part of a program, but is provided in the register of the SRAM area 600. The program then refers to the specified time in the register. In this configuration, a change to the time length before lapsing into the low-power-consumption mode is easily changed by rewriting the information in the register.

4) Information about Code Used for Notifying Host of Deletion of Accessed Data

When data that is requested for access has been already deleted, the CPU 41 generally transfers a code "FFh" to the host that requested the access. Some manufacturers of the host devices may use a different code such as "00h" for this purpose.

In consideration of this, when there is a need to notify the host of a deleted status of requested data, the CPU 41 refers to the control information that specifies a code used for notifying of deletion of requested data as such information is stored in the register of the SRAM area 600. Then, the CPU 41 transfers the specified code such as "FFh" or "00h" to the host device.

Namely, the code for notifying of deletion of requested data is not specified as part of a program, but is provided in the register of the SRAM area 600. The program then refers to the specified code in the register. In this configuration, a change to the code for notifying of deletion of requested data is easily changed by rewriting the information in the register.

6) Control Information Indicating Whether Specified Bits of Register are Valid or Invalid When the memory card 30 operates according to the PCMCIA interface standard (which is an interface standard for a PC card or the like), the memory card 30 operates in one of the four defined operation modes, i.e., a memory mode defined by the PCMCIA standard, an independent I/O mode, an I/O primary mode, or an I/O secondary mode.

Data for indicating one of these operation modes is stored in an internal register 601 of the CPU 41 as shown in FIG. 29. Since only two bits are necessary for identifying one of the four operation modes, other bits in addition to these two bits are redundant for the identification purpose.

The control information indicating whether specified bits of the internal register (601) are valid or invalid is provided for the purpose of masking the redundant bits. When the control information specifies the mask pattern, the CPU 41 extracts two bits while ignoring the redundant bits by using this mask so as to identify the operation mode.

6) Identification Information about Card Standard

The memory card 30 may be used as a PC card, or may be used as a Compact Flash (trademark of a SanDisk corporation in the United States), for example. The identification information about the card standard is used for indicating either use as a PC card or use as a Compact Flash.

The PC card complies with the PCMCIA interface standard whereas the Compact Flash complies with both the PCMCIA interface standard and the IDE interface standard (which is an interface standard for a hard drive). The Compact Flash supports additional commands (e.g., a command for erasing the contents of a sector) that are not supported by the PC card. Where the memory card 30 is used as the PC card, the CPU 41 needs to reject a command sent from the host device if the command is a Compact-Flash command that is not supported by the PC card.

To this end, the CPU 41 refers to the identification information about the card standard that is stored in the register of the SRAM area 600 when the CPU 41 receives a command from the host device. Based on the identification information, the CPU 41 determines whether the PC card is used or the Compact Flash is used, and, then, attends to appropriate processing to decide whether to accept a particular command from the host device.

7) Identification Information about Method of Generating Internal Table

Figure 30:
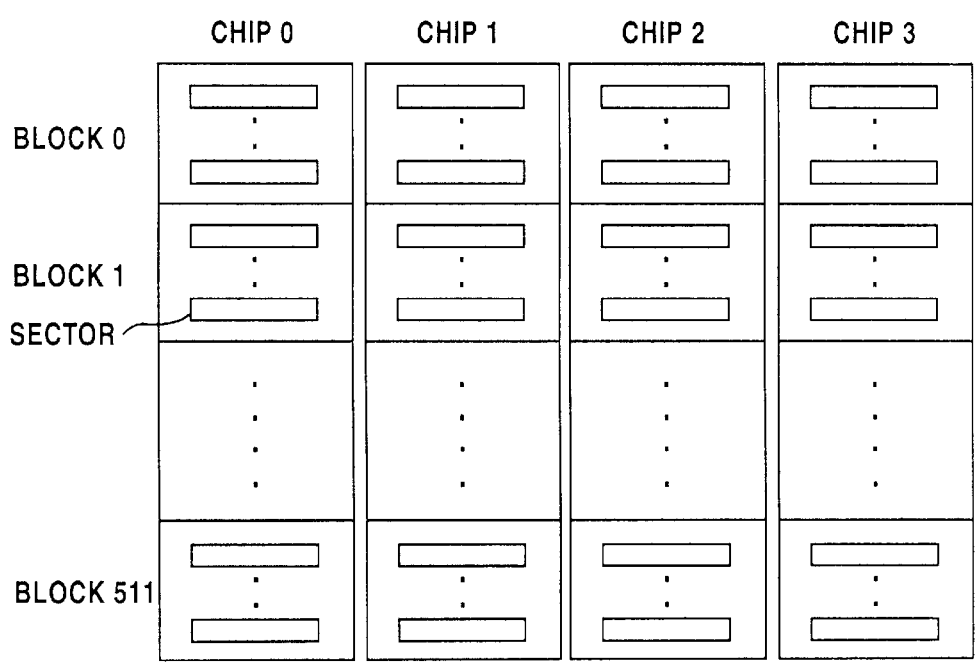
FIG. 30 is an illustrative drawing showing a configuration of the flash memories.

FIG. 30 is an illustrative drawing showing a configuration of the flash memories 100.

As shown in FIG. 30, a flash memory chip is divided into 512 blocks, each of which serves as a unit of data erasure. Each block is comprised of 8 sectors, each of which is a minimum unit of data storage. Data stored in each sector is provided with a logical address issued by the host device. All the data stored in a given block have the same logical address assigned thereto.

An internal table is loaded in the SRAM area 600 of the CPU 41, and stores correspondences between logical addresses and block numbers so as to allow a conversion from a logical address to a physical address.

FIG. 31 is an illustrative drawing showing a configuration of the internal table. FIG. 31 shows an example of the internal table when 4 flash memories 100 are provided.

A portion of the table regarding one of the flash memories 100 having a chip number 0 stores a block number of a block where data having a logical address 0 is stored, a block number of a block where data having a logical address 4 is stored, and so on. A portion of the table regarding one of the flash memories 100 having a chip number 1 stores a block number of a block where data having a logical address 1 is stored, a block number of a block where data having a logical address 5 is stored, and so on. A portion of the table regarding one of the flash memories 100 having a chip number 2 stores a block number of a block where data having a logical address 2 is stored, a block number of a block where data having a logical address 6 is stored, and so on. Finally, a portion of the table regarding one of the flash memories 100 having a chip number 3 stores a block number of a block where data having a logical address 3 is stored, a block number of a block where data having a logical address 7 is stored, and so on.

According to such a data structure of the internal table, the CPU 41 identifies a chip number and a block number corresponding to a logical address when the host device such as the digital camera 60 or the personal computer 70 issues an access request specifying the logical address. In this manner, the CPU 41 can obtain a physical address which is to be accessed.

The internal address as described above is generated as follows. That is, the blocks of the flash memories 100 are successively accessed to obtain a block number of a block where data is stored and to obtain a logical address which is attached to the data stored in the block. Then, the obtained block number is stored in a field of the internal table that corresponds to the obtained logical address.

The internal table may be generated in its entirety in advance before the host device issues any access request, such that the host device is permitted to issue an access request only after the generation of the entire internal table. Alternatively, the internal table may be generated partially before the host issues an access request, and, thereafter, may be generated only with respect to a portion relating to a chip number of a specified logical address each time the host device issues an access request for the specified logical address. Alternatively, the internal table may be generated partially before the host issues an access request, and, thereafter, may be generated with respect to a portion relating to a chip number of a specified logical address each time the host device issues an access request for the specified logical address, with a generation process being constantly engaged to generate the internal table even during a time period when there is no access request.

In consideration of these variations, the CPU 41 refers to the identification information about a method of generating an internal table stored in the register of the SRAM area 600 when the memory card 30 starts an operation thereof. Using the specified method, then, the CPU 41 generates the internal table. This configuration allows a change to be easily made to the method of generating an internal table.

As described above, the memory card 30 according to the present invention stores information necessary for operations thereof in the flash memories 100, and the information is loaded in the register that is referred to by the program executed by the CPU 41 when the memory card 30 starts an operation thereof. Because of this configuration, there is no need to provide an extra connector terminal to the memory card 30 for the purpose of informing the memory card 30 of the information necessary for the operation thereof. Further, the operation information of the memory card 30 can be easily modified by rewriting the operation information in the flash memories 100.

The embodiments described with reference to FIGS. 26 through 29 are provided for the description purpose only, and are not intended to limit the scope of the invention in any manner. For example, the memory card 30 described in connection with FIGS. 26 through 29 are provided with the flash memories 100, but other memories of any time may be provided as an alternative as long as these memories have a function to retain data thereof during a time period when power is not supplied.

In the following, another embodiment will be described with regard to how to determine whether the flash memories 100 operate based on the scheme 1 or based on the scheme 2.

FIG. 32 is a block diagram of the chip-enable-signal generation circuit 43 with details added to the configuration of FIG. 4.

An enable signal for indicating a conversion into a binary code is supplied via the same signal line to the first binary-code-conversion circuit 401 for generating the chip-enable signal with respect to the flash memories 100 based on the scheme 1 and the second binary-code-conversion circuit 402 for generating the chip-enable generation signal with respect to the flash memories 100 based on the scheme 2. Provision of such an enable signal was omitted from FIG. 4, but may be necessary for the operation of the chip-enable-signal generation circuit 43.

Figure 33:
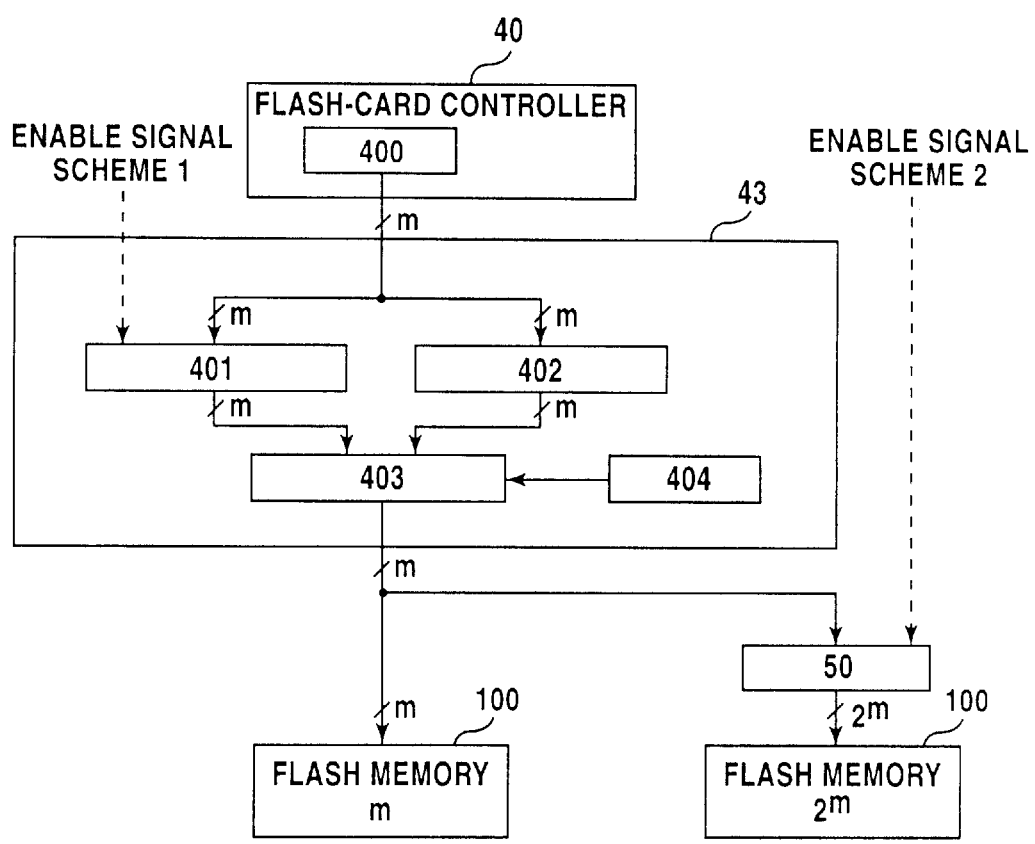
FIG. 33 is a block diagram of the chip-enable-signal generation circuit according to another embodiment of the present invention.

FIG. 33 is a block diagram of the chip-enable-signal generation circuit 43 according to another embodiment of the present invention.

As shown in FIG. 33, an enable signal indicating use of the scheme 1 and an enable signal indicating use of the scheme 2 may be provided separately. The enable signal indicating use of the scheme 1 is supplied to the first binary-code-conversion circuit 401, and the enable signal indicating use of the scheme 2 is supplied to the decoder 50.

The second binary-code-conversion circuit 402 in this case is provided with an enable signal at all times.

Figure 34:
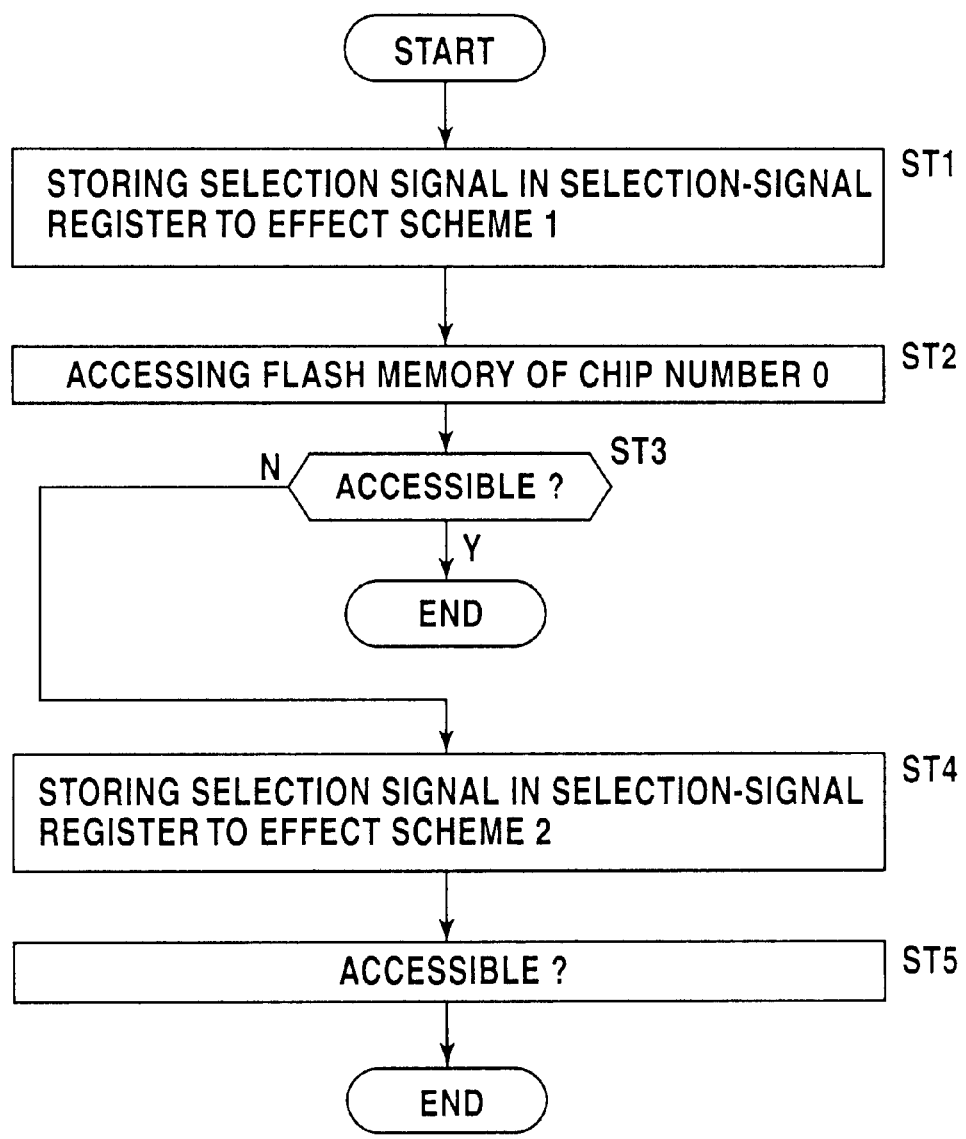
FIG. 34 is a flowchart of a process performed by the CPU.

FIG. 34 is a flowchart of a process performed by the CPU 41.

In the configuration of FIG. 33, the CPU 41 performs the process of FIG. 34 when the memory card 30 starts an operation thereof, thereby setting an appropriate selection signal in the selection-signal register 404.

Namely, when the memory card 30 starts operating, at a step ST1 of FIG. 34, the CPU 41 sets a selection signal in the selection-signal register 404 so as to control the multiplexer 403 to select an output from the first binary-code-conversion circuit 401.

At a step ST2, access is made to the first one of the flash memories 100 having a chip number 0 in order to obtain the information stored therein.

Since the selection signal has been specified at the step ST1 such that the multiplexer 403 selects an output of the first binary-code-conversion circuit 401, the enable signal for indicating use of the scheme 1 is active whereas the enable signal for indicating use of the scheme 2 is inactive. If the flash memories 100 operating based on the scheme 2 are implemented, therefore, access to the flash memories 100 cannot be made because of an inactive status of the decoder 50.

At a step ST3, a check is made as to whether the access to the flash memories 100 was successful at the step ST2. If the access was successful, i.e., if the flash memories 100 operating based on the scheme 1 are implemented, it is ascertained that the selection signal stored in the selection-signal register 404 is correct. This ends the procedure.

If the check at the step ST3 finds that the access to the flash memories 100 was not successful at the step ST2, i.e., if the flash memories 100 operating based on the scheme 2 are implemented, the procedure goes to a step ST4 where a new selection signal is stored in the selection-signal register 404 so as to control the multiplexer 403 to select an output from the second binary-code-conversion circuit 402.

At a step ST5, access is made to the first one of the flash memories 100 having the chip number 0, thereby obtaining the information stored in the first one of the flash memories 100 having the chip number 0.

In this manner, the configuration of FIG. 33 lets the CPU 41 to perform the process of FIG. 34 so as to set an appropriate selection signal in the selection-signal register 404.

In the process of FIG. 34, the step ST1 sets such a selection signal as to make the multiplexer 403 select an output of the first binary-code-conversion circuit 401. Alternatively, the step ST1 may set such a selection signal as to make the multiplexer 403 select an output of the second binary-code-conversion circuit 402. In such a configuration, if the step ST3 finds that access to the first one of the flash memories 100 having the chip number 0 cannot be made, the step ST4 sets a new selection signal in the selection-signal register 404 so as to make the multiplexer 403 select an output from the first binary-code-conversion circuit 401.

Further, the process of FIG. 34 has been described with regard to a case in which either the m flash memories 100 are provided or the $2^m$ flash memories 100 are provided as in the configuration of FIG. 4. The process of FIG. 34, however, is equally applicable to the case in which the m flash memories 100 are provided or the $2^{m+n}$ flash memories 100 are provided as in the configuration of FIG. 14.

According to the present invention as described hereinbefore, a configuration usable for both a device having m chips at maximum and a device having $2^m$ chips at maximum or usable for both a device having m chips at maximum and a device having $2^{m+n}$ chips at maximum can generate an appropriate chip-enable signal without a help from an external source informing of chip information.

Further, according to the present invention, a memory device having memories that can retain data thereof during a time when power is not supplied stores information necessary for operation of the memory device in these memories, and the information is loaded to a register that is referred to by a program when the memory device starts an operation thereof. Because of this configuration, there is no need to provide an extra connector terminal to the memory device for the purpose of informing the memory device of the information necessary for the operation thereof. Further, the operation information of the memory device can be easily modified by rewriting the operation information stored in the memories.

Moreover, according to the present invention, both a chip-enable signal supplied to the memories and a chip-enable generation signal that is to be decoded to generate a chip-enable signal supplied to the memories are generated, and the chip-enable signal is selected and supplied to the memories when no decoder is provided, whereas the chip-enable generation signal is selected and supplied to a decoder when such a decoder is provided. In this manner, a decision is easily made as to whether to supply the chip-enable signal or to supply the chip-enable generation signal.

Further, the present invention is not limited to these embodiments, but various variations and modifications may be made without departing from the scope of the present invention.

The present application is based on Japanese priority applications No. 10-215274 filed on Jul. 30, 1998, and No. 10-258215 filed on Sep. 11, 1998, with Japanese Patent Office, the entire contents of which are hereby incorporated by reference.

What is claimed is:

1. A circuit for enabling a chip, usable for both a first device capable of having m chips and a second device having more than m chips, said circuit comprising:

a first generation unit which generates a chip-enable signal that includes a bit pattern of m bits for enabling one of the m chips identified by a specific chip number and that indicates the first device as being enabled;

a second generation unit which generates a chip-enable generation signal that is to be decoded into a chip-enable signal of at least $2^m$ bits for enabling one of the more than m chips identified by the specific chip number and that indicates the second device as being enabled, the chip-enable generation signal including a bit pattern identical to said bit pattern of m bits; and a selection unit which based on information gathered through the specific chip number selects and outputs the chip-enable signal generated by said first generation unit when said circuit is used for the first device, and selects and outputs the chip-enable generation signal generated by said second generation unit when said circuit is used for the second device.

2. The circuit as claimed in claim 1, wherein the second device is capable of having $2^m$ chips, and wherein the chip-enable signal generated by said first generation unit is comprised of m bits for enabling one of the m chips indicated by the chip number, and the chip-enable generation signal generated by said second generation unit is comprised of m bits that is to be decoded into a chip-enable signal of $2^m$ bits for enabling one of the $2^m$ chips indicated by the chip number, the chip-enable generation signal generated by the second generation unit being identical to the chip-enable signal generated by the first generation unit when the chip number is equal to the specific number.

3. The circuit as claimed in claim 1, wherein the second device is capable of having $2^{m+n}$ chips, wherein the chip-enable signal generated by said first generation unit is comprised of m+n bits that include m lower bits for enabling one of the m chips indicated by a chip number, and the chip-enable generation signal generated by said second generation unit is comprised of m+n bits that are to be decoded into a chip-enable signal of $2^{m+n}$ bits for enabling one of the $2^{m+n}$ chips indicated by the chip number, the chip-enable generation signal generated by the second generation unit being identical to the chip-enable signal generated by the first generation unit when the chip number is equal to the specific number.

4. A memory device comprising the first device, the second device, and the circuit of claim 1 wherein the chips comprise memory chips.

5. A circuit for enabling a chip, usable for both a first device capable of having m chips and a second device having more than m chips, said circuit comprising:

a first generation unit which generates a chip-enable signal that includes a bit pattern of m bits for enabling one of the m chips indicated by a chip number;

a second generation unit which generates a chip-enable generation signal that is to be decoded into a chip-enable signal of at least $2^m$ bits for enabling one of the more than m chips indicated by the chip number, the chip-enable generation signal including a bit pattern identical to said bit pattern of m bits when the chip number is equal to a specific number; and a selection unit which selects and outputs the chip-enable signal generated by said first generation unit when said circuit is used for the first device, and selects and outputs the chip-enable generation signal generated by said second generation unit when said circuit is used for the second device;

wherein the second device is capable of having $2^{m+n}$ chips, wherein the chip-enable signal generated by said first generation unit is comprised of m+n bits that include m lower bits for enabling one of the m chips indicated by a chip number, and the chip-enable generation signal generated by said second generation unit is comprised of m+n bits that are to be decoded into a chip-enable signal of $2^{m+n}$ bits for enabling one of the $2^{m+n}$ chips indicated by the chip number, the chip-enable generation signal generated by the second generation unit being identical to the chip-enable signal generated by the first generation unit when the chip number is equal to the specific number;

wherein said second generation unit obtains n upper bits and m lower bits of the chip-enable generation signal from a quotient and a remainder, respectively, of an operation which divides the chip number by $2^m$, and wherein said first generation unit uses the n upper bits of the chip-enable generation signal as n upper bits of the chip-enable signal generated by said first generation unit.

6. A circuit for enabling a chip, usable for both a first device capable of having m chips and a second device having more than m chips, said circuit comprising:

a first generation unit which generates a chip-enable signal that includes a bit pattern of m bits for enabling one of the m chips indicated by a chip number;

a second generation unit which generates a chip-enable generation signal that is to be decoded into a chip-enable signal of at least $2^m$ bits for enabling one of the more than m chips indicated by the chip number, the chip-enable generation signal including a bit pattern identical to said bit pattern of m bits when the chip number is equal to a specific number; and a selection unit which selects and outputs the chip-enable signal generated by said first generation unit when said circuit is used for the first device, and selects and outputs the chip-enable generation signal generated by said second generation unit when said circuit is used for the second device;

an acquisition unit which obtains information about whether said circuit is used for the first device or is used for the second device, the information being obtained by accessing one of the chips that is enabled by the chip-enable signal corresponding to the specific number; and a setting unit which sets a selection signal based on the information obtained by said acquisition unit, the selection signal controlling said selection unit with regard to whether the chip-enable signal generated by said first generation unit is selected or the chip-enable generation signal generated by said second generation unit is selected.

7. A circuit for enabling a chip, usable for both a first device capable of having m chips and a second device having more than m chips, said circuit comprising:

a first generation unit which generates a chip-enable signal that includes a bit pattern of m bits for enabling one of the m chips indicated by a chip number;

a second generation unit which generates a chip-enable generation signal that is to be decoded into a chip-enable signal of at least $2^m$ bits for enabling one of the more than m chips indicated by the chip number, the chip-enable generation signal including a bit pattern identical to said bit pattern of m bits when the chip number is equal to a specific number; and a selection unit which selects and outputs the chip-enable signal generated by said first generation unit when said circuit is used for the first device, and selects and outputs the chip-enable generation signal generated by said second generation unit when said circuit is used for the second device;

wherein the second device is capable of having $2^m$ chips, and wherein the chip-enable signal generated by said first generation unit is comprised of m bits for enabling one of the m chips indicated by the chip number, and the chip-enable generation signal generated by said second generation unit is comprised of m bits that is to be decoded into a chip-enable signal of $2^m$ bits for enabling one of the $2^m$ chips indicated by the chip number, the chip-enable generation signal generated by the second generation unit being identical to the chip-enable signal generated by the first generation unit when the chip number is equal to the specific number;

wherein said first generation unit generates the chip-enable signal comprised of m bits with only one bit thereof being 1 in accordance with the chip number starting from zero, and said second generation unit generates the chip-enable generation signal as a binary representation of the chip number plus one in response to the chip number starting from zero.

8. The circuit as claimed in claim 7, further comprising:

an acquisition unit which obtains information about whether said circuit is used for the first device or is used for the second device, the information being obtained by accessing one of the chips that is enabled by the chip-enable signal corresponding to the specific number that is either 0 or 1; and a setting unit which sets a selection signal based on the information obtained by said acquisition unit, the selection signal controlling said selection unit with regard to whether the chip-enable signal generated by said first generation unit is selected or the chip-enable generation signal generated by said second generation unit is selected.

9. A circuit for enabling a chip, usable for both a first device capable of having m chips and a second device having more than m chips, said circuit comprising:

a first generation unit which generates a chip-enable signal that includes a bit pattern of m bits for enabling one of the m chips indicated by a chip number;

a second generation unit which generates a chip-enable generation signal that is to be decoded into a chip-enable signal of at least $2^m$ bits for enabling one of the more than m chips indicated by the chip number, the chip-enable generation signal including a bit pattern identical to said bit pattern of m bits when the chip number is equal to a specific number; and a selection unit which selects and outputs the chip-enable signal generated by said first generation unit when said circuit is used for the first device, and selects and outputs the chip-enable generation signal generated by said second generation unit when said circuit is used for the second device;

wherein the second device is capable of having $2^m$ chips, and wherein the chip-enable signal generated by said first generation unit is comprised of m bits for enabling one of the m chips indicated by the chip number, and the chip-enable generation signal generated by said second generation unit is comprised of m bits that is to be decoded into a chip-enable signal of $2^m$ bits for enabling one of the $2^m$ chips indicated by the chip number, the chip-enable generation signal generated by the second generation unit being identical to the chip-enable signal generated by the first generation unit when the chip number is equal to the specific number;

wherein said first generation unit generates the chip-enable signal comprised of m bits with only one bit thereof being 0 in accordance with the chip number starting from zero, and said second generation unit generates the chip-enable generation signal as an inverse of a binary representation of the chip number minus one in response to the chip number starting from zero.

10. A circuit for enabling a chip, usable for both a first device capable of having m chips and a second device having more than m chips, said circuit comprising:

a first generation unit which generates a chip-enable signal that includes a bit pattern of m bits for enabling one of the m chips indicated by a chip number;

a second generation unit which generates a chip-enable generation signal that is to be decoded into a chip-enable signal of at least $2^m$ bits for enabling one of the more than m chips indicated by the chip number, the chip-enable generation signal including a bit pattern identical to said bit pattern of m bits when the chip number is equal to a specific number; and a selection unit which selects and outputs the chip-enable signal generated by said first generation unit when said circuit is used for the first device, and selects and outputs the chip-enable generation signal generated by said second generation unit when said circuit is used for the second device;

wherein the second device is capable of having $2^{m+n}$ chips, wherein the chip-enable signal generated by said first generation unit is comprised of m+n bits that include m lower bits for enabling one of the m chips indicated by a chip number, and the chip-enable generation signal generated by said second generation unit is comprised of m+n bits that are to be decoded into a chip-enable signal of $2^{m+n}$ bits for enabling one of the $2^{m+n}$ chips indicated by the chip number, the chip-enable generation signal generated by the second generation unit being identical to the chip-enable signal generated by the first generation unit when the chip number is equal to the specific number;

wherein said first generation unit generates the chip-enable signal comprised of m+n bits with only one bit of the m lower bits thereof being 1 in accordance with the chip number starting from zero, and said second generation unit generates the chip-enable generation signal comprised of m+n bits in response to the chip number starting from zero such that m lower bits of the chip-enable generation signal are one plus a remainder of an operation dividing the chip number by $2^m$.

11. A circuit for enabling a chip, usable for both a first device capable of having m chips and a second device having more than m chips, said circuit comprising:

a first generation unit which generates a chip-enable signal that includes a bit pattern of m bits for enabling one of the m chips indicated by a chip number;

a second generation unit which generates a chip-enable generation signal that is to be decoded into a chip-enable signal of at least $2^m$ bits for enabling one of the more than m chips indicated by the chip number, the chip-enable generation signal including a bit pattern identical to said bit pattern of m bits when the chip number is equal to a specific number; and a selection unit which selects and outputs the chip-enable signal generated by said first generation unit when said circuit is used for the first device, and selects and outputs the chip-enable generation signal generated by said second generation unit when said circuit is used for the second device;

wherein the second device is capable of having $2^{m+n}$ chips, wherein the chip-enable signal generated by said first generation unit is comprised of m+n bits that include m lower bits for enabling one of the m chips indicated by a chip number, and the chip-enable generation signal generated by said second generation unit is comprised of m+n bits that are to be decoded into a chip-enable signal of $2^{m+n}$ bits for enabling one of the $2^{m+n}$ chips indicated by the chip number, the chip-enable generation signal generated by the second generation unit being identical to the chip-enable signal generated by the first generation unit when the chip number is equal to the specific number;

wherein said first generation unit generates the chip-enable signal comprised of m+n bits with only one bit of the m lower bits thereof being 0 in accordance with the chip number starting from zero, and said second generation unit generates the chip-enable generation signal comprised of m+n bits in response to the chip number starting from zero such that m lower bits of the chip-enable generation signal are an inverse of a binary value minus one, the binary value being a remainder of an operation dividing the chip number by $2^m$.

12. A circuit for enabling a chip, usable for both a first device capable of having m chips and a second device having more than m chips, said circuit comprising:

a first generation unit which generates a chip-enable signal that includes a bit pattern of m bits for enabling one of the m chips indicated by a chip number;

a second generation unit which generates a chip-enable generation signal that is to be decoded into a chip-enable signal of at least $2^m$ bits for enabling one of the more than m chips indicated by the chip number, the chip-enable generation signal including a bit pattern identical to said bit pattern of m bits when the chip number is equal to a specific number; and a selection unit which selects and outputs the chip-enable signal generated by said first generation unit when said circuit is used for the first device, and selects and outputs the chip-enable generation signal generated by said second generation unit when said circuit is used for the second device;

wherein the second device is capable of having $2^m$ chips, and wherein the chip-enable signal generated by said first generation unit is comprised of m bits for enabling one of the m chips indicated by the chip number, and the chip-enable generation signal generated by said second generation unit is comprised of m bits that is to be decoded into a chip-enable signal of $2^m$ bits for enabling one of the $2^m$ chips indicated by the chip number, the chip-enable generation signal generated by the second generation unit being identical to the chip-enable signal generated by the first generation unit when the chip number is equal to the specific number;

wherein said first generation unit generates the chip-enable signal comprised of m bits with only one bit thereof being 1 in accordance with the chip number starting from one, and said second generation unit generates the chip-enable generation signal as a binary representation of the chip number in response to the chip number starting from one.

13. The circuit as claimed in claim 12, further comprising:

an acquisition unit which obtains information about whether said circuit is used for the first device or is used for the second device, the information being obtained by accessing one of the chips that is enabled by the chip-enable signal corresponding to the specific number that is either 1 or 2; and a setting unit which sets a selection signal based on the information obtained by said acquisition unit, the selection signal controlling said selection unit with regard to whether the chip-enable signal generated by said first generation unit is selected or the chip-enable generation signal generated by said second generation unit is selected.

14. A circuit for enabling a chip, usable for both a first device capable of having m chips and a second device having more than m chips, said circuit comprising:

a first generation unit which generates a chip-enable signal that includes a bit pattern of m bits for enabling one of the m chips indicated by a chip number;

a second generation unit which generates a chip-enable generation signal that is to be decoded into a chip-enable signal of at least $2^m$ bits for enabling one of the more than m chips indicated by the chip number, the chip-enable generation signal including a bit pattern identical to said bit pattern of m bits when the chip number is equal to a specific number; and a selection unit which selects and outputs the chip-enable signal generated by said first generation unit when said circuit is used for the first device, and selects and outputs the chip-enable generation signal generated by said second generation unit when said circuit is used for the second device;

wherein the second device is capable of having $2^m$ chips, and wherein the chip-enable signal generated by said first generation unit is comprised of m bits for enabling one of the m chips indicated by the chip number, and the chip-enable generation signal generated by said second generation unit is comprised of m bits that is to be decoded into a chip-enable signal of $2^m$ bits for enabling one of the $2^m$ chips indicated by the chip number, the chip-enable generation signal generated by the second generation unit being identical to the chip-enable signal generated by the first generation unit when the chip number is equal to the specific number;

wherein said first generation unit generates the chip-enable signal comprised of m bits with only one bit thereof being 0 in accordance with the chip number starting from one, and said second generation unit generates the chip-enable generation signal as an inverse of a binary representation of the chip number in response to the chip number starting from one.

15. A circuit for enabling a chip, usable for both a first device capable of having m chips and a second device having more than m chips, said circuit comprising:

a first generation unit which generates a chip-enable signal that includes a bit pattern of m bits for enabling one of the m chips indicated by a chip number;

a second generation unit which generates a chip-enable generation signal that is to be decoded into a chip-enable signal of at least $2^m$ bits for enabling one of the more than m chips indicated by the chip number, the chip-enable generation signal including a bit pattern identical to said bit pattern of m bits when the chip number is equal to a specific number; and a selection unit which selects and outputs the chip-enable signal generated by said first generation unit when said circuit is used for the first device, and selects and outputs the chip-enable generation signal generated by said second generation unit when said circuit is used for the second device;

wherein the second device is capable of having $2^{m+n}$ chips, wherein the chip-enable signal generated by said first generation unit is comprised of m+n bits that include m lower bits for enabling one of the m chips indicated by a chip number, and the chip-enable generation signal generated by said second generation unit is comprised of m+n bits that are to be decoded into a chip-enable signal of $2^{m+n}$ bits for enabling one of the $2^{m+n}$ chips indicated by the chip number, the chip-enable generation signal generated by the second generation unit being identical to the chip-enable signal generated by the first generation unit when the chip number is equal to the specific number;

where said first generation unit generates the chip-enable signal comprised of m+n bits with only one bit of the m lower bits thereof being 1 in accordance with the chip number starting from one, and said second generation unit generates the chip-enable generation signal comprised of m+n bits in response to the chip number starting from one such that m lower bits of the chip-enable generation signal are one plus a remainder of an operation dividing the chip number minus one by $2^m$.

16. A circuit for enabling a chip, usable for both a first device capable of having m chips and a second device having more than m chips, said circuit comprising:

a first generation unit which generates a chip-enable signal that includes a bit pattern of m bits for enabling one of the m chips indicated by a chip number;

a second generation unit which generates a chip-enable generation signal that is to be decoded into a chip-enable signal of at least $2^m$ bits for enabling one of the more than m chips indicated by the chip number, the chip-enable generation signal including a bit pattern identical to said bit pattern of m bits when the chip number is equal to a specific number; and a selection unit which selects and outputs the chip-enable signal generated by said first generation unit when said circuit is used for the first device, and selects and outputs the chip-enable generation signal generated by said second generation unit when said circuit is used for the second device;

wherein the second device is capable of having $2^{m+n}$ chips, wherein the chip-enable signal generated by said first generation unit is comprised of m+n bits that include m lower bits for enabling one of the m chips indicated by a chip number, and the chip-enable generation signal generated by said second generation unit is comprised of m+n bits that are to be decoded into a chip-enable signal of $2^{m+n}$ bits for enabling one of the $2^{m+n}$ chips indicated by the chip number, the chip-enable generation signal generated by the second generation unit being identical to the chip-enable signal generated by the first generation unit when the chip number is equal to the specific number;

wherein said first generation unit generates the chip-enable signal comprised of m+n bits with only one bit of the m lower bits thereof being 0 in accordance with the chip number starting from one, and said second generation unit generates the chip-enable generation signal comprised of m+n bits in response to the chip number starting from one such that m lower bits of the chip-enable generation signal are an inverse of a binary value minus one, the binary value being a remainder of an operation dividing the chip number minus one by $2^m$.

* * * * *